(12) United States Patent
Sugawara et al.

(10) Patent No.: US 10,732,532 B1
(45) Date of Patent: *Aug. 4, 2020

(54) ELECTROSTATIC IMAGE DEVELOPING TONER, ELECTROSTATIC IMAGE DEVELOPER, AND TONER CARTRIDGE

(71) Applicant: FUJI XEROX CO., LTD., Tokyo (JP)

(72) Inventors: Atsushi Sugawara, Kanagawa (JP); Yasuo Kadokura, Kanagawa (JP); Daisuke Tomita, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/517,791

(22) Filed: Jul. 22, 2019

(30) Foreign Application Priority Data

Mar. 22, 2019 (JP) ................................. 2019-054845

(51) Int. Cl.
| | | |
|---|---|---|
| *G03G 9/08* | (2006.01) | |
| *G03G 9/087* | (2006.01) | |
| *G03G 9/09* | (2006.01) | |
| *G03G 15/08* | (2006.01) | |

(Continued)

(52) U.S. Cl.
CPC ....... *G03G 9/08786* (2013.01); *C08F 283/01* (2013.01); *G03G 9/0819* (2013.01); *G03G 9/0821* (2013.01); *G03G 9/08711* (2013.01); *G03G 9/08755* (2013.01); *G03G 9/08782* (2013.01); *G03G 9/08795* (2013.01); *G03G 9/091* (2013.01); *G03G 9/09775* (2013.01); *G03G 15/0865* (2013.01)

(58) Field of Classification Search
CPC ........... G03G 9/08711; G03G 9/08755; G03G 9/08795; G03G 9/0821; G03G 9/08782

USPC ........................................................ 430/109.4
See application file for complete search history.

(56) References Cited

U.S. PATENT DOCUMENTS 10,423,088 B1 * 9/2019 Sugawara .......... G03G 9/08711

FOREIGN PATENT DOCUMENTS

| JP | 2018-013600 A | 1/2018 |
| JP | 2018-097153 A | 6/2018 |

OTHER PUBLICATIONS

"Pipes and fitting made of crosslinked polyethylene (PE-X)-Estimation of the degree of crosslinking by determination of the gel content" JIS K6796, Aug. 20, 1998, 17 pages, Japanese Standards Association, Japan.

(Continued)

*Primary Examiner* — Mark A Chapman
(74) *Attorney, Agent, or Firm* — Sughrue Mion, PLLC

(57) ABSTRACT

An electrostatic image developing toner includes toner base particles including at least a binder resin and a release agent, wherein the binder resin includes a hybrid resin having a polyester resin segment and a styrene-acrylic copolymer segment, and a molecular weight distribution curve of the toner satisfies Formula (1): $1.3 \leq b/a \leq 2.5$, where, in the molecular weight distribution curve in which a perpendicular line is drawn from a baseline to a peak top having a peak top height to divide the molecular weight distribution curve into a lower-molecular-weight region and a higher-molecular-weight region, a represents a width of the lower-molecular-weight region at a height of 15% of the peak top height, and b represents a width of the higher-molecular-weight region at a height of 15% of the peak top height.

17 Claims, 3 Drawing Sheets

(51) Int. Cl.
*G03G 9/097* (2006.01)
*C08F 283/01* (2006.01)

(56) References Cited

OTHER PUBLICATIONS

"Test method for acid value, saponification value, ester value, iodine value, hydroxyl value and unsaponifiable matter of chemical products" JIS K0070, 1992, 38 pages, Japanese Standards Association, Japan.

"Testing Methods for Transition Temperatures of Plastics" JIS K 7121, Oct. 1, 1987, 26 pages, Japanese Standards Association, Japan.

\* cited by examiner

ELECTROSTATIC IMAGE DEVELOPING TONER, ELECTROSTATIC IMAGE DEVELOPER, AND TONER CARTRIDGE

CROSS-REFERENCE TO RELATED APPLICATIONS

This application is based on and claims priority under 35 USC 119 from Japanese Patent Application No. 2019-054845 filed Mar. 22, 2019.

BACKGROUND

(i) Technical Field

The present disclosure relates to an electrostatic image developing toner, an electrostatic image developer, and a toner cartridge.

(ii) Related Art

Methods of visualizing image information via electrostatic images such as electrophotographic methods are used in various technical fields.

In general, such an electrophotographic method visualizes image information by the following plural steps: an electrostatic latent image is formed on a photoconductor or an electrostatic recording member by any method; to this electrostatic latent image, particles that are electrically attracted to opposite charges and referred to as toner are caused to adhere, to develop the electrostatic latent image (toner image); the toner image is transferred onto the surface of a transfer member, and fixed by heating, for example.

There is a known method for producing toner described in Japanese Unexamined Patent Application Publication No. 2018-97153.

Japanese Unexamined Patent Application Publication No. 2018-97153 discloses a method for producing an electrostatic image developing toner including a step of aggregating and fusing particles including resin particles and coloring agent particles in an aqueous medium, wherein the resin particles contain a hybrid resin having a polyester segment, an addition polymerization resin segment that is an addition polymer of a starting monomer containing a styrene-based compound, and a unit derived from a double-reactive monomer; and the coloring agent particles are obtained by mixing a coloring agent and a compound represented by the following formula (1).

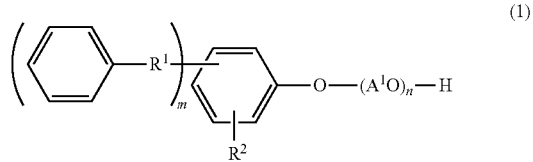
(1)

In the formula, $R^1$ represents an alkanediyl group having 1 or more and 12 or less carbon atoms; m represents an average number of substitution and m is 1 or more and 4 or less; $R^2$ represents a hydrogen atom or a methyl group; $A^1O$ represents an oxyalkylene group; $A^1$ represents an ethylene group or a propylene group; and n represents an average number of moles of alkylene oxide added, and n is 5 or more and 100 or less.

There is a known toner described in Japanese Unexamined Patent Application Publication No. 2018-13600.

Japanese Unexamined Patent Application Publication No. 2018-13600 discloses a toner including toner particles containing a binder resin and a release agent, wherein the binder resin contains a binder resin A and a binder resin B; the binder resin A is a hybrid resin in which a vinyl-based polymer unit and a polyester unit are chemically combined; a mass ratio of the vinyl-based polymer unit to the polyester unit (vinyl-based polymer unit/polyester unit) is 10/90 to 50/50; the vinyl-based polymer unit is a polymer obtained by polymerization of at least styrene and a compound represented by formula (1), $$CH_2=CR^1COOR^2 \qquad (1)$$

where $R^1$ represents H or a methyl group, $R^2$ represents an alkyl group or hydroxyalkyl group having 12 or less carbon atoms, relative to the total number of moles of vinyl-based monomers used for polymerization of the vinyl-based polymer unit, the percentage of the compound represented by formula (1) is 20 mol % or more and 90 mol % or less; and the binder resin B is a polyester resin having a condensation end derived from at least one aliphatic compound selected from the group consisting of an aliphatic monocarboxylic acid having 25 or more and 102 or less carbon atoms and an aliphatic monoalcohol having 25 or more and 102 or less carbon atoms.

SUMMARY

Aspects of non-limiting embodiments of the present disclosure relate to an electrostatic image developing toner that has a high reducibility of gloss non-uniformity even in the case of forming images having high toner mass per unit area, compared with cases where a binder resin includes a styrene-acrylic copolymer alone or a toner has a molecular weight distribution curve in which b/a is less than 1.3 or more than 2.5.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an electrostatic image developing toner including: toner base particles including at least a binder resin and a release agent, wherein the binder resin includes a hybrid resin having a polyester resin segment and a styrene-acrylic copolymer segment, and a molecular weight distribution curve of the toner satisfies Formula (1):

$$1.3 \leq b/a \leq 2.5 \qquad (1)$$

where, in the molecular weight distribution curve in which a perpendicular line is drawn from a baseline to a peak top having a peak top height to divide the molecular weight distribution curve into a lower-molecular-weight region and a higher-molecular-weight region, a represents a width of the lower-molecular-weight region at a height of 15% of the peak top height, and b represents a width of the higher-molecular-weight region at a height of 15% of the peak top height.

BRIEF DESCRIPTION OF THE DRAWINGS

Exemplary embodiments of the present disclosure will be described in detail based on the following figures, wherein.

DETAILED DESCRIPTION

Figure 1:
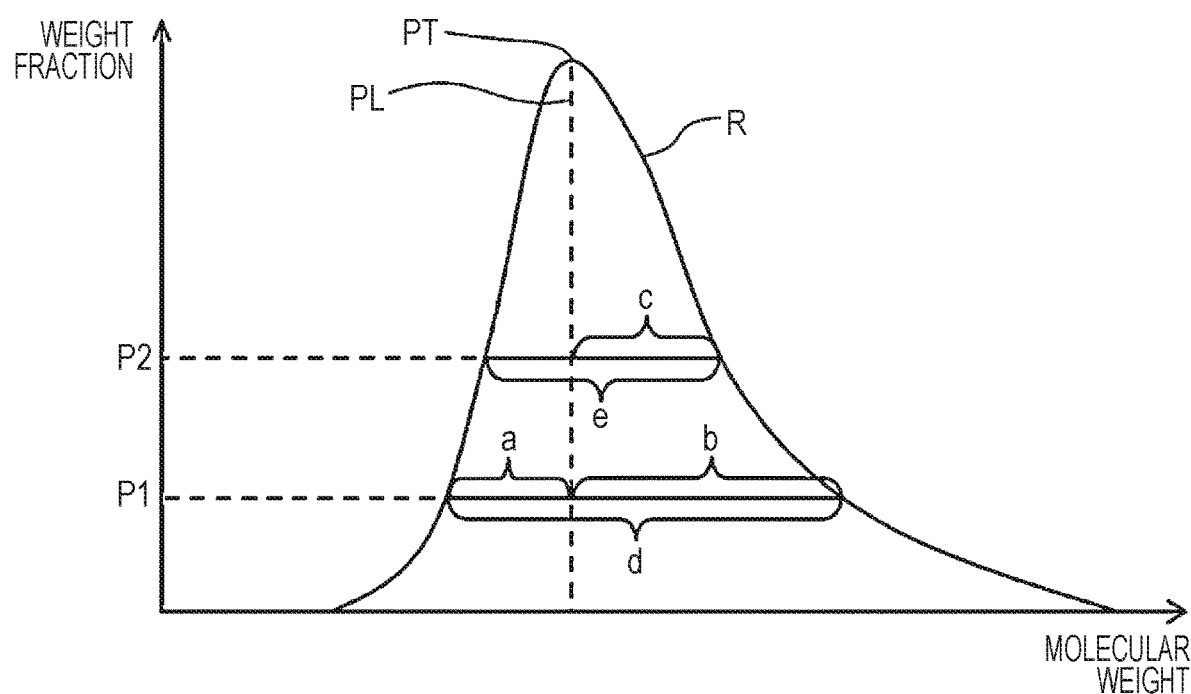
FIG. 1 is a schematic view illustrating an example of a molecular weight distribution curve of a hybrid resin used for an exemplary embodiment.

In this Specification, when the amount of a component of a composition is described and the composition includes a plurality of substances belonging to the component, the amount means the total amount of the plurality of substances in the composition unless otherwise specified.

In this Specification, the "electrostatic image developing toner" is also simply referred to as "toner", and the "electrostatic image developer" is also simply referred to as "developer".

Hereinafter, exemplary embodiments that are examples of the present disclosure will be described.
Electrostatic Image Developing Toner An electrostatic image developing toner according to the exemplary embodiment includes toner base particles including at least a binder resin and a release agent, wherein the binder resin includes a hybrid resin having a polyester resin segment and a styrene-acrylic copolymer segment, and a molecular weight distribution curve of the toner satisfies Formula (1):

$$1.3 \leq b/a \leq 2.5 \tag{1}$$

where, in the molecular weight distribution curve in which a perpendicular line is drawn from a baseline to a peak top having a peak top height to divide the molecular weight distribution curve into a lower-molecular-weight region and a higher-molecular-weight region, a represents a width of the lower-molecular-weight region at a height of 15% of the peak top height, and b represents a width of the higher-molecular-weight region at a height of 15% of the peak top height.

Toners using existing binder resins have insufficient toner elasticity and hence do not have sufficient releasability from recording media. Thus, in the case of forming images having high toner mass per unit area, gloss non-uniformity tends to occur.

The electrostatic image developing toner according to the exemplary embodiment has the above-described features, so that, even in the case of forming images having high toner mass per unit area, it exhibits a high reducibility of gloss non-uniformity (hereafter, also simply referred to as "reducibility of gloss non-uniformity"). The mechanism of this has not been clarified, but is inferred as follows.

The electrostatic image developing toner includes, as the binder resin, a hybrid resin having a polyester resin segment and a styrene-acrylic copolymer segment, and the hybrid resin has a molecular weight distribution curve that satisfies Formula (1) above. As a result, the binder resin has a higher content of higher-molecular-weight components, and both of toner elasticity and seepage of the release agent are achieved, so that, even in the case of forming images having high toner mass per unit area, a high reducibility of gloss non-uniformity (hereafter, also simply referred to as "reducibility of gloss non-uniformity") is provided.

The binder resin, that is, the hybrid resin having a polyester resin segment and a styrene-acrylic copolymer segment has both of these resins in a single molecule, so that both of the resins are uniformly dispersed. The presence of the hybrid resin in which the resins are uniformly dispersed provides a reduction in non-uniformity during fixing.

Hereinafter, the electrostatic image developing toner according to the exemplary embodiment will be described in detail.

The toner according to the exemplary embodiment includes toner base particles (also referred to as "toner particles") and optionally an external additive.

The toner according to the exemplary embodiment is preferably a yellow toner from the viewpoint of reducibility of gloss non-uniformity.
Toner Base Particles The toner base particles include, for example, a binder resin, a release agent, and optionally a coloring agent and other additives, and preferably include a binder resin, a coloring agent, and a release agent.
Binder Resin The electrostatic image developing toner according to the exemplary embodiment includes toner base particles at least containing a binder resin. The binder resin includes a hybrid resin having a polyester resin segment and a styrene-acrylic copolymer segment. The molecular weight distribution curve of the toner satisfies Formula (1) above.
Hybrid Resin Having Polyester Resin Segment and Styrene-Acrylic Copolymer Segment The binder resin includes a hybrid resin having a polyester resin segment and a styrene-acrylic copolymer segment (also simply referred to as the "hybrid resin").

The hybrid resin satisfies Formula (1) above.
Molecular Weight Distribution Curve FIG. 1 is a schematic view illustrating an example of the molecular weight distribution curve of the toner according to the exemplary embodiment.

In FIG. 1, the abscissa axis indicates molecular weight, and the ordinate axis indicates weight fraction.

In FIG. 1, a molecular weight distribution curve R has a peak top PT.

In the molecular weight distribution curve R in which a perpendicular line PL is drawn from the baseline to the peak top PT having a peak top height to divide the molecular weight distribution curve R into a lower-molecular-weight region and a higher-molecular-weight region, a represents the width of the lower-molecular-weight region at a height P1 of 15% of the peak top height, and b represents the width of the higher-molecular-weight region at the height P1 of 15% of the peak top height.

In the molecular weight distribution curve R in which the perpendicular line PL is drawn from the baseline to the peak top PT having a peak top height to divide the molecular weight distribution curve R into a lower-molecular-weight region and a higher-molecular-weight region, c represents the width of the higher-molecular-weight region at a height P2 of 40% of the peak top height; d represents the width of the molecular weight distribution curve R at the height P1 of 15% of the peak top height; and e represents the width of the molecular weight distribution curve R at the height P2 of 40% of the peak top height.

The molecular weight distribution curve of the toner preferably satisfies, from the viewpoint of reducibility of gloss non-uniformity, the following Formula (1-1), more preferably satisfies the following Formula (1-2).

$$1.5 \leq b/a \leq 2.4 \tag{1-1}$$

$$1.8 \leq b/a \leq 2.3 \tag{1-2}$$

The molecular weight distribution curve of the toner preferably satisfies, from the viewpoint of reducibility of gloss non-uniformity, the following Formula (2), more preferably satisfies the following Formula (2-1), particularly preferably satisfies the following Formula (2-2).

$$2.5 \leq b/c \qquad (2)$$

$$3.0 \leq b/c \qquad (2\text{-}1)$$

$$3.5 \leq b/c \leq 5.0 \qquad (2\text{-}2)$$

In the molecular weight distribution curve in which a perpendicular line is drawn from the baseline to the peak top having a peak top height to divide the molecular weight distribution curve into a lower-molecular-weight region and a higher-molecular-weight region, c represents the width of the higher-molecular-weight region at a height of 40% of the peak top height.

From the viewpoint of reducibility of gloss non-uniformity, widths of the molecular weight distribution curve of the toner that are the width d at a height of 15% of the peak top height and the width e at a height of 40% of the peak top height preferably satisfy d/e≤2.0, more preferably satisfy d/e≤2.5, particularly preferably satisfy 5.0≤d/e≤3.0.

Average Molecular Weight of Binder Resin

From the viewpoint of reducibility of gloss non-uniformity, the binder resin preferably has a weight-average molecular weight Mw of 10,000 or more and 200,000 or less, more preferably 50,000 or more and 120,000 or less, particularly preferably 60,000 or more and 110,000 or less.

From the viewpoint of reducibility of gloss non-uniformity, the binder resin preferably has a z-average molecular weight Mz of 100,000 or more and 2,000,000 or less, more preferably 200,000 or more and 1,300,000 or less, particularly preferably 400,000 or more and 1,000,000 or less.

The average molecular weight of the binder resin is measured by gel permeation chromatography (GPC). The GPC molecular weight measurement is performed with a measurement apparatus that is GPC HLC-8120GPC, manufactured by Tosoh Corporation, a column that is TSKgel SuperHM-M (15 cm), manufactured by Tosoh Corporation, and a tetrahydrofuran (THF) solvent. From the measurement results, a molecular weight distribution curve (molecular weight calibration curve) is created using monodispersed polystyrene standard samples. From the molecular weight distribution curve, the weight-average molecular weight Mw and the z-average molecular weight Mz are calculated.

Gel Fraction of Hybrid Resin

From the viewpoint of reducibility of gloss non-uniformity, the hybrid resin preferably has a gel fraction of 1 mass % or more and 20 mass % or less, more preferably 3 mass % or more and 15 mass % or less, particularly preferably 4 mass % or more and 10 mass % or less.

The gel fraction is measured in accordance with JIS K6796(1998). From the toner, the hybrid resin is sampled and measured for its mass. This is the mass of pre-solvent-extraction hybrid resin. Subsequently, the hybrid resin is immersed in tetrahydrofuran at 45° C. for 24 hours, and then filtered to isolate and collect the residue; the residue is dried and measured for its mass. This mass is the dry mass of post-extraction residue. The following formula is used to calculate gel fraction.

Gel fraction (%)=((dry mass of post-extraction residue)/(mass of pre-solvent-extraction hybrid resin))×100

The gel fraction of the hybrid resin can be adjusted by using a tri- or higher valent polycarboxylic acid or a tri- or higher hydric polyol for the polyester resin segment.

The mechanism of providing a high "reducibility of gloss non-uniformity" for images having high toner mass per unit area has not been fully clarified, but is inferred as follows.

The close proximity between an aromatic such as styrene and an aromatic in the pigment due to the π-π interaction is used to achieve fine dispersion in the toner.

In addition, the three-dimensional structure of styrene is effective for achieving fine dispersion of styrene, and hence gelation is caused in the styrene-acrylic copolymer.

The three-dimensional structure of the styrene-acrylic copolymer segment is effectively provided by using an acrylic monomer having a di- or higher valent unsaturated bond moiety. Preferred examples include di(meth)acrylate compounds and poly(meth)acrylate compounds.

Examples of the di(meth)acrylate compounds include polyethylene glycol diacrylate, 1,6-hexanediol diacrylate, 1,9-nonanediol diacrylate, and 1,10-decanediol diacrylate. Examples of the poly(meth)acrylate compounds include pentaerythritol triacrylate, trimethylolpropane triacrylate, and pentaerythritol tetraacrylate.

Polyester Resin Segment

The polyester resin segment of the hybrid resin is preferably, for example, a polycondensate of an alcohol component (a-al) and a carboxylic acid component (a-ac). The hybrid resin includes such a polyester resin segment, to thereby provide a toner having high low-temperature fixability.

Examples of the alcohol component (a-al) include linear or branched aliphatic diols, aromatic diols, alicyclic diols, and tri- or higher hydric polyols. Of these, preferred are aromatic diols, more preferred is an alkylene oxide adduct of bisphenol A from the viewpoint of low-temperature fixability and increased image density of printed materials.

The alkylene oxide adduct of bisphenol A is preferably at least one selected from the group consisting of an ethylene oxide adduct of bisphenol A (2,2-bis(4-hydroxyphenyl)propane) and a propylene oxide adduct of bisphenol A, more preferably the propylene oxide adduct of bisphenol A.

The alkylene oxide adduct of bisphenol A preferably has an average number of moles of alkylene oxide added of 1 or more, more preferably 1.2 or more, still more preferably 1.5 or more, and preferably 16 or less, more preferably 12 or less, still more preferably 8 or less, particularly preferably 4 or less.

The amount of alkylene oxide adduct of bisphenol A in the alcohol component (a-al) is preferably 80 mol % or more, more preferably 90 mol % or more, still more preferably 95 mol % or more, particularly preferably 98 mol % or more and 100 mol % or less, most preferably 100 mol %.

The alcohol component (a-al) may contain an alcohol component other than the alkylene oxide adduct of bisphenol A. Examples of such other alcohol components include linear or branched aliphatic diols, other aromatic diols, alicyclic diols, and tri- or higher hydric polyols.

Examples of the linear or branched aliphatic diols include ethylene glycol, 1,2-propanediol, 1,3-propanediol, 1,2-butanediol, 1,3-butanediol, 1,4-butanediol, 2,3-butanediol, 2,2-dimethyl-1,3-propanediol, 1,6-hexanediol, 1,8-octanediol, 1,9-nonanediol, 1,10-decanediol, and 1,12-dodecanediol.

Examples of the alicyclic diols include hydrogenated bisphenol A (2,2-bis(4-hydroxycyclohexyl)propane), and a $C_{2-4}$ alkylene oxide adduct (average number of moles of alkylene oxide added: 2 or more and 12 or less) of hydrogenated bisphenol A.

Examples of the tri- or higher hydric polyols include glycerol, pentaerythritol, trimethylolpropane, and sorbitol.

Such alcohol components may be used alone or in combination of two or more thereof.

Examples of the carboxylic acid component (a-ac) include dicarboxylic acids and tri- or higher valent polycarboxylic acids.

Examples of the dicarboxylic acids include aromatic dicarboxylic acids, linear or branched aliphatic dicarboxylic acids, and alicyclic dicarboxylic acids. Of these, preferred is at least one compound selected from the group consisting of aromatic dicarboxylic acids and linear or branched aliphatic dicarboxylic acids.

Examples of the aromatic dicarboxylic acids include phthalic acid, isophthalic acid, and terephthalic acid. Of these, preferred is at least one compound selected from the group consisting of isophthalic acid and terephthalic acid, more preferred is terephthalic acid.

The amount of aromatic dicarboxylic acid in the carboxylic acid component (a-ac) is preferably 20 mol % or more, more preferably 25 mol % or more, more preferably 30 mol % or more, and preferably 90 mol % or less, more preferably 70 mol % or less, still more preferably 50 mol % or less.

The number of carbon atoms of the linear or branched aliphatic dicarboxylic acid is preferably 2 or more, more preferably 3 or more, and preferably 30 or less, more preferably 20 or less.

Examples of the linear or branched aliphatic dicarboxylic acid having 2 or more and 30 or less carbon atoms include oxalic acid, malonic acid, maleic acid, fumaric acid, citraconic acid, itaconic acid, glutaconic acid, succinic acid, adipic acid, sebacic acid, dodecanedioic acid, azelaic acid, and succinic acid that is substituted with an alkyl group having 1 or more and 20 or less carbon atoms or an alkenyl group having 2 or more and 20 or less carbon atoms.

Examples of the succinic acid that is substituted with an alkyl group having 1 or more and 20 or less carbon atoms or an alkenyl group having 2 or more and 20 or less carbon atoms include dodecylsuccinic acid, dodecenylsuccinic acid, and octenylsuccinic acid.

Of these, preferred is at least one compound selected from the group consisting of terephthalic acid, sebacic acid, and fumaric acid, more preferred is use of a combination of two or more thereof.

The tri- or higher valent polycarboxylic acids are preferably tricarboxylic acids, such as trimellitic acid.

When the tri- or higher valent polycarboxylic acid is included, the amount of tri- or higher valent polycarboxylic acid in the carboxylic acid component (a-ac) is preferably 3 mol % or more, more preferably 5 mol % or more, and preferably 20 mol % or less, more preferably 15 mol % or less, still more preferably 12 mol % or less.

Such carboxylic acid components may be used alone or in combination of two or more thereof.

The ratio [COOH group/OH group] of the carboxy groups of the carboxylic acid component (a-ac) to the hydroxy groups of the alcohol component (a-al) is preferably 0.7 or more, more preferably 0.8 or more, and preferably 1.3 or less, more preferably 1.2 or less.

Styrene-Acrylic Copolymer Segment

Examples of a styrene-based compound used for forming the styrene-acrylic copolymer segment include substituted or unsubstituted styrene. Examples of the substituent include alkyl groups having 1 or more and 5 or less carbon atoms, halogen atoms, alkoxy groups having 1 or more and 5 or less carbon atoms, and a sulfonic group or salts thereof.

Examples of the styrene-based compound include styrenes such as styrene, methylstyrene, α-methylstyrene, β-methylstyrene, tert-butylstyrene, chlorostyrene, chloromethylstyrene, methoxystyrene, and styrenesulfonic acid or salts thereof.

Of these, preferred is styrene.

From the viewpoint of reducibility of gloss non-uniformity, the amount of styrene-based compound, preferably styrene, relative to the starting monomers of the styrene-acrylic copolymer segment, is preferably 50 mass % or more and 95 mass % or less, more preferably 55 mass % or more and 90 mass % or less, particularly preferably 60 mass % or more and 85 mass % or less.

From the viewpoint of reducibility of gloss non-uniformity, the content of the styrene-based compound, preferably a styrene-derived monomer unit (also referred to as the "monomer unit formed from styrene"), relative to the total mass of the styrene-acrylic copolymer segment, is preferably 50 mass % or more and 95 mass % or less, more preferably 55 mass % or more and 90 mass % or less, particularly preferably 60 mass % or more and 85 mass % or less.

From the viewpoint of reducibility of gloss non-uniformity, in the hybrid resin, the content of the styrene-derived constitutional unit relative to the total mass of the hybrid resin is preferably 1 mass % or more and 50 mass % or less, more preferably 3 mass % or more and 40 mass % or less, still more preferably 5 mass % or more and 35 mass % or less, particularly preferably 8 mass % or more and 30 mass % or less.

Preferred examples of a (meth)acrylic compound used for forming the styrene-acrylic copolymer segment include (meth)acrylate compounds, (meth)acrylamide compounds, (meth)acrylic acid, and (meth)acrylonitrile; more preferred are (meth)acrylate compounds; particularly preferred are (meth)acrylic acid alkyl esters. In the cases of (meth)acrylic acid alkyl esters, the hydrocarbon groups are alcohol residues of the esters.

Examples of the (meth)acrylic acid alkyl esters include (iso)propyl (meth)acrylate, (iso)butyl (meth)acrylate, (iso)hexyl (meth)acrylate, cyclohexyl (meth)acrylate, (iso)octyl (meth)acrylate (hereafter, also referred to as 2-ethylhexyl (meth)acrylate), (iso)decyl (meth)acrylate, (iso)dodecyl (meth)acrylate (hereafter, also referred to as (iso)lauryl (meth)acrylate), (iso)palmityl (meth)acrylate, (iso)stearyl (meth)acrylate, and (iso)behenyl (meth)acrylate.

Of these, preferred are 2-ethylhexyl (meth)acrylate, (iso)decyl (meth)acrylate, (iso)dodecyl (meth)acrylate, (iso)stearyl (meth)acrylate, and (iso)behenyl (meth)acrylate; more preferred are 2-ethylhexyl (meth)acrylate, (iso)dodecyl (meth)acrylate, and (iso)stearyl (meth)acrylate; still more preferred are (iso)dodecyl (meth)acrylate and (iso)stearyl (meth)acrylate; and yet more preferred is (iso)stearyl (meth)acrylate.

The term "alkyl (meth)acrylate" means alkyl acrylate or alkyl methacrylate. The term "(iso)" of the alkyl moiety means normal alkyl or iso alkyl.

From the viewpoint of reducibility of gloss non-uniformity, the amount of (meth)acrylic compound in the starting monomers of the styrene-acrylic copolymer segment is preferably 5 mass % or more and 50 mass % or less, more preferably 10 mass % or more and 45 mass % or less, particularly preferably 15 mass % or more and 40 mass % or less.

From the viewpoint of reducibility of gloss non-uniformity, the content of (meth)acrylic compound-derived monomer unit relative to the total mass of the styrene-acrylic copolymer segment is preferably 5 mass % or more and 50 mass % or less, more preferably 10 mass % or more and 45 mass % or less, particularly preferably 15 mass % or more and 40 mass % or less.

Examples of other starting monomers include ethylenically unsaturated monoolefins such as ethylene and propylene; conjugated dienes such as butadiene; halovinyls such as vinyl chloride; vinyl esters such as vinyl acetate and vinyl propionate; (meth)acrylic acid aminoalkyl esters such as dimethylaminoethyl (meth)acrylate; vinyl ethers such as methyl vinyl ether; vinylidene halides such as vinylidene chloride; and N-vinyl compounds such as N-vinylpyrrolidone.

Double-Reactive Monomer-Derived Unit

The hybrid resin, from the viewpoint of image density of printed materials, preferably has a double-reactive monomer-derived unit. When double-reactive monomers are used as starting monomers of the hybrid resin, the double-reactive monomers react with the polyester resin segment and the styrene-acrylic copolymer segment, or starting monomers of both segments, to form bonding points between the polyester resin segment and the styrene-acrylic copolymer segment.

The "double-reactive monomer-derived unit" means a unit provided by a reaction of a functional group or a vinyl moiety of such a double-reactive monomer.

Examples of the double-reactive monomer include a vinyl-based monomer intramolecularly having at least one functional group selected from the group consisting of a hydroxy group, a carboxy group, an epoxy group, a primary amino group, and a secondary amino group. Of these, from the viewpoint of reactivity, preferred is a vinyl-based monomer having a hydroxy group or a carboxy group, more preferred is a vinyl-based monomer having a carboxy group.

Examples of the double-reactive monomer include acrylic acid, methacrylic acid, fumaric acid, and maleic acid. Of these, from the viewpoint of reactivity of both of a polycondensation reaction and an addition polymerization reaction, preferred are acrylic acid and methacrylic acid, more preferred is acrylic acid.

From the viewpoint of a further increase in the image density of printed materials, the content of the double-reactive monomer-derived unit relative to 100 molar parts of the alcohol component of the polyester resin segment of the hybrid resin is preferably 1 molar part or more, more preferably 5 molar parts or more, still more preferably 8 molar parts or more, and preferably 30 molar parts or less, more preferably 25 molar parts or less, still more preferably 20 molar parts or less. In the case of using the double-reactive monomer and calculating the amounts of the segments in the hybrid resin, this calculation is performed such that the constitutional unit derived from the double-reactive monomer is included in the polyester resin segment.

From the viewpoint of reducibility of gloss non-uniformity, the amount of polyester resin segment in the hybrid resin relative to the total mass of the hybrid resin is preferably 40 mass % or more, more preferably 50 mass % or more, still more preferably 55 mass % or more, and preferably 95 mass % or less, more preferably 85 mass % or less, still more preferably 80 mass % or less.

From the viewpoint of reducibility of gloss non-uniformity, in the hybrid resin, the amount of styrene-acrylic copolymer segment relative to the total mass of the hybrid resin is preferably 10 mass % or more, more preferably 15 mass % or more, still more preferably 20 mass % or more, and preferably 60 mass % or less, more preferably 50 mass % or less, still more preferably 45 mass % or less.

From the viewpoint of reducibility of gloss non-uniformity, in the hybrid resin, the total amount of the polyester resin segment and the styrene-acrylic copolymer segment relative to the total mass of the hybrid resin is preferably 80 mass % or more and 100 mass % or less, more preferably 90 mass % or more and 100 mass % or less, still more preferably 93 mass % or more and 100 mass % or less, particularly preferably 95 mass % or more and 100 mass % or less.

From the viewpoint of reducibility of density non-uniformity in images to be obtained, the hybrid resin preferably has a softening temperature Tm of 70° C. or more, more preferably 90° C. or more, still more preferably 100° C. or more, and preferably 140° C. or less, more preferably 130° C. or less, still more preferably 125° C. or less.

The softening temperature Tm of the resin is measured with a FLOWTESTER (manufactured by SHIMADZU CORPORATION: CFT-500C): 1 g of a sample is measured under a load of 10 kgf/cm$^2$, with a nozzle diameter of 1 mm and a nozzle length of 1 mm, with preheating at 80° C. for 5 minutes, and at a heating rate of 6° C./min; in the FLOWTESTER plunger descent-temperature curve, the temperature at the ½ height of the sigmoid curve (½ flow temperature) is determined as the softening temperature.

From the viewpoint of reducibility of density non-uniformity in images to be obtained, the hybrid resin preferably has a glass transition temperature of 30° C. or more, more preferably 35° C. or more, still more preferably 40° C. or more, and preferably 70° C. or less, more preferably 60° C. or less, still more preferably 55° C. or less.

The glass transition temperature Tg of the resin is measured by a method described later.

From the viewpoint of reducibility of density non-uniformity in images to be obtained, the hybrid resin preferably has an acid value of 5 mgKOH/g or more, more preferably 10 mgKOH/g or more, still more preferably 15 mgKOH/g or more, and preferably 40 mgKOH/g or less, more preferably 35 mgKOH/g or less, still more preferably 30 mgKOH/g or less.

The acid value is the number of milligrams of potassium hydroxide for achieving neutralization of the acid groups (such as carboxy groups) of 1 g of a sample. In the exemplary embodiment, the acid value is measured in accordance with the method (potentiometric titration) defined in JIS K0070-1992.

Incidentally, when the sample is in a neutralized state, it is measured after being turned back to a sample having acid groups (such as carboxy groups) by being subjected to a reduced pressure (optionally further to heating) to remove the neutralization agent, or by being subjected to acid treatment. When the sample does not dissolve, a solvent such as dioxane or tetrahydrofuran (THF) is used.

The softening temperature, glass transition temperature, and acid value of the hybrid resin can be appropriately adjusted by changing production conditions such as the type and amount of starting monomers employed, reaction temperature, reaction time, and cooling rate; these values are determined by methods described in EXAMPLES.

When two or more hybrid resins are used in combination, the softening temperature, glass transition temperature, and acid value of the mixture thereof preferably satisfy the above-described ranges.

The method of producing the hybrid resin includes, for example, polycondensation of the alcohol component (a-al) and the carboxylic acid component (a-ac), and an addition polymerization reaction of the starting monomers of the styrene-acrylic copolymer segment and double-reactive monomers. More specifically, examples of the method include the following methods (i) to (iii).

(i) A method of causing a polycondensation reaction of the alcohol component (a-al) and the carboxylic acid component (a-ac), and subsequently causing an addition polymerization reaction of the starting monomers of the styrene-acrylic copolymer segment and double-reactive monomers From the viewpoint of reactivity, the starting monomers of the styrene-acrylic copolymer segment and the double-reactive monomers are preferably supplied together to the reaction system. From the viewpoint of reactivity, catalysts such as an esterification catalyst and an esterification promoter may be used; furthermore, a radical polymerization initiator and a radical polymerization inhibitor may be used.

From the viewpoint of causing the polycondensation reaction and optionally further causing the reaction with the double-reactive monomers, preferably, a portion of the carboxylic acid component is added to the polycondensation reaction, subsequently an addition polymerization reaction is performed, then the reaction temperature is again increased, and the remaining portion of the carboxylic acid component is added to the reaction system.

Alternatively, the hybrid resin can be produced by the following method (ii) or (iii).

(ii) A method in which an addition polymerization reaction of starting monomers of the styrene-acrylic copolymer segment and double-reactive monomers is followed by a polycondensation reaction of starting monomers of the polyester resin segment (iii) A method in which a polycondensation reaction of an alcohol component and a carboxylic acid component and an addition polymerization reaction of starting monomers of the styrene-acrylic copolymer segment and double-reactive monomers are simultaneously performed The polycondensation reaction and the addition polymerization reaction in the above-described methods (i) to (iii) are preferably performed within the same vessel.

The hybrid resin is preferably produced by the above-described method (i) or (ii) from the viewpoint of the high degree of freedom of the reaction temperature of the polycondensation reaction, more preferably produced by the method (i).

In the polycondensation reaction, the alcohol component (a-al) and the carboxylic acid component (a-ac) are subjected to polycondensation. Optionally, the polycondensation may be performed with an esterification catalyst, such as tin(II) di(2-ethylhexanoate), dibutyl tin oxide, or titanium diisopropylate bis(triethanolaminate), in an amount of 0.01 parts by mass or more and 5 parts by mass or less relative to 100 parts by mass of the total amount of the alcohol component and the carboxylic acid component; with an esterification promoter, such as gallic acid (identical to 3,4,5-trihydroxybenzoic acid), in an amount of 0.001 parts by mass or more and 0.5 parts by mass or less relative to 100 parts by mass of the total amount of the alcohol component and the carboxylic acid component; and optionally with a radical polymerization inhibitor, such as 4-tert-butylcatechol, in an amount of 0.001 parts by mass or more and 0.5 parts by mass or less relative to 100 parts by mass of the total amount of the alcohol component and the carboxylic acid component.

The polycondensation reaction is preferably performed at a temperature of 120° C. or more, more preferably 160° C. or more, still more preferably 180° C. or more, and preferably 250° C. or less, more preferably 230° C. or less.

The polycondensation may be performed in an inert gas atmosphere.

In the addition polymerization reaction, starting monomers of the styrene-acrylic copolymer segment and double-reactive monomers are subjected to addition polymerization.

The addition polymerization reaction is preferably performed at a temperature of 110° C. or more, more preferably 130° C. or more, and preferably 220° C. or less, more preferably 200° C. or less. In the latter half of the polymerization, the reaction system is preferably subjected to a reduced pressure, to accelerate the reaction.

Examples of the polymerization initiator of the addition polymerization reaction include publicly known radical polymerization initiators, for example, peroxides such as dibutyl peroxide, persulfates such as sodium persulfate, and azo compounds such as 2,2'-azobis(2,4-dimethylvaleronitrile).

The amount of radical polymerization initiator used relative to 100 parts by mass of starting monomers of the styrene-acrylic copolymer segment is preferably 1 part by mass or more, more preferably 5 parts by mass or more, and preferably 20 parts by mass or less, more preferably 15 parts by mass or less.

Another Binder Resin

The binder resin may further include another binder resin other than the hybrid resin.

Examples of the other binder resin include vinyl-based resins composed of homopolymers of monomers such as styrenes (such as styrene, para-chlorostyrene, and α-methylstyrene), (meth)acrylic acid esters (such as methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, and 2-ethylhexyl methacrylate), ethylenically unsaturated nitriles (such as acrylonitrile and methacrylonitrile), vinyl ethers (such as vinyl methyl ether and vinyl isobutyl ether), vinyl ketones (such as vinyl methyl ketone, vinyl ethyl ketone, and vinyl isopropenyl ketone), and olefins (such as ethylene, propylene, and butadiene); and vinyl-based resins composed of copolymers of two or more species of such monomers.

Examples of the other binder resin include non-vinyl-based resins such as epoxy resins, polyester resins, polyurethane resins, polyamide resins, cellulose resins, polyether resins, and modified rosin; mixtures of such a non-vinyl-based resin and the above-described vinyl-based resin; and graft polymers obtained by polymerizing vinyl-based monomers in the presence of such a non-vinyl-based resin.

Of these, preferred is at least one resin selected from the group consisting of polyester resins and styrene-acrylic copolymers, more preferred is a polyester resin.

Such other binder resins may be used alone or in combination of two or more thereof.

Examples of the other binder resin include amorphous (also referred to as "non-crystalline") resins and crystalline resins. Incidentally, the hybrid resin is preferably an amorphous resin.

From the viewpoint of reducibility of gloss non-uniformity, the binder resin preferably includes a crystalline resin.

The crystalline resin content relative to the total mass of the binder resin is preferably 2 mass % or more and 40 mass % or less, more preferably 2 mass % or more and 20 mass % or less.

Incidentally, a resin that is "crystalline" exhibits, in the result of differential scanning calorimetry (DSC), not any stepped endothermic change, but a distinctive endothermic peak: specifically, when the resin is measured at a heating rate of 10° C./min, the endothermic peak has a half width of 10° C. or less.

By contrast, a resin that is "amorphous" has a half width of more than 10° C. and exhibits a stepped endothermic change or does not have any distinctive endothermic peak.

Examples of the polyester resins include publicly known polyester resins.

Amorphous Polyester Resin

Such an amorphous polyester resin is, for example, a polycondensate of a polycarboxylic acid and a polyhydric alcohol. The amorphous polyester resin may be a commercially available product or may be synthesized.

Examples of the polycarboxylic acid include aliphatic dicarboxylic acids (such as oxalic acid, malonic acid, maleic acid, fumaric acid, citraconic acid, itaconic acid, glutaconic acid, succinic acid, alkenylsuccinic acid, adipic acid, and sebacic acid), alicyclic dicarboxylic acids (such as cyclohexanedicarboxylic acid), aromatic dicarboxylic acids (such as terephthalic acid, isophthalic acid, phthalic acid, and naphthalenedicarboxylic acid), and anhydrides or lower (such as $C_{1-5}$) alkyl esters of the foregoing. Of these, preferred examples of the polycarboxylic acid are aromatic dicarboxylic acids.

The polycarboxylic acid may be a combination of a dicarboxylic acid and a tri- or higher carboxylic acid having a bridged structure or a branched structure. Examples of the tri- or higher carboxylic acid include trimellitic acid, pyromellitic acid, and anhydrides or lower (such as $C_{1-5}$) alkyl esters of the foregoing.

Such polycarboxylic acids may be used alone or in combination of two or more thereof.

Examples of the polyhydric alcohol include aliphatic diols (such as ethylene glycol, diethylene glycol, triethylene glycol, propylene glycol, butanediol, hexanediol, and neopentyl glycol), alicyclic diols (such as cyclohexanediol, cyclohexanedimethanol, and hydrogenated bisphenol A), and aromatic diols (such as ethylene oxide adducts of bisphenol A, and propylene oxide adducts of bisphenol A). Of these, preferred examples of the polyhydric alcohol are aromatic diols and alicyclic diols, more preferred are aromatic diols.

The polyhydric alcohol may be a combination of a diol and a tri- or higher hydric polyol having a bridged structure or a branched structure. Examples of the tri- or higher hydric polyol include glycerol, trimethylolpropane, and pentaerythritol.

Such polyhydric alcohols may be used alone or in combination of two or more thereof.

The amorphous polyester resin preferably has a glass transition temperature (Tg) of 50° C. or more and 80° C. or less, more preferably 50° C. or more and 65° C. or less.

The glass transition temperature is determined from a differential scanning calorimetry (DSC) curve obtained by DSC, more specifically, measured in accordance with "extrapolated glass transition onset temperature" described in "How to Determine Glass Transition Temperature" in JIS K 7121-1987 "Testing Methods for Transition Temperatures of Plastics".

The amorphous polyester resin preferably has a weight-average molecular weight (Mw) of 5,000 or more and 1,000,000 or less, more preferably 7,000 or more and 500,000 or less.

The amorphous polyester resin preferably has a number-average molecular weight (Mn) of 2,000 or more and 100,000 or less.

The amorphous polyester resin preferably has a polydispersity index Mw/Mn of 1.5 or more and 100 or less, more preferably 2 or more and 60 or less.

The weight-average molecular weight and the number-average molecular weight are measured by gel permeation chromatography (GPC). The GPC molecular weight measurement is performed with a measurement apparatus that is a GPC HLC-8120GPC, manufactured by Tosoh Corporation, a column TSKgel SuperHM-M (15 cm), manufactured by Tosoh Corporation, and a THF solvent. From the measurement result, the weight-average molecular weight and the number-average molecular weight are calculated using a molecular weight calibration curve created using monodispersed polystyrene standard samples.

The amorphous polyester resin is obtained by a well-known production method: specifically, for example, a method of causing the reaction at a polymerization temperature of 180° C. or more and 230° C. or less optionally at a reduced pressure within the reaction system while water or alcohol generated during condensation is removed.

When starting monomers do not dissolve or mix at the reaction temperature, a solvent having a high boiling point may be added as a solubilizing agent to dissolve the starting monomers. In this case, the polycondensation reaction is performed while the solubilizing agent is driven off. When some monomers have low miscibility, these monomers having low miscibility and an acid or alcohol that is used for polycondensation with the monomers may be subjected to condensation in advance, and then subjected to polycondensation with the main component.

Crystalline Polyester Resin

The crystalline polyester resin is, for example, a polycondensate of a polycarboxylic acid and a polyhydric alcohol. The crystalline polyester resin may be a commercially available product or may be synthesized.

In order to easily form the crystalline structure, the crystalline polyester resin is preferably a polycondensate made from linear aliphatic polymerizable monomers, compared with aromatic polymerizable monomers.

Examples of the polycarboxylic acid include aliphatic dicarboxylic acids (such as oxalic acid, succinic acid, glutaric acid, adipic acid, suberic acid, azelaic acid, sebacic acid, 1,9-nonanedicarboxylic acid, 1,10-decanedicarboxylic acid, 1,12-dodecanedicarboxylic acid, 1,14-tetradecanedicarboxylic acid, and 1,18-octadecanedicarboxylic acid), aromatic dicarboxylic acids (such as dibasic acids such as phthalic acid, isophthalic acid, terephthalic acid, and naphthalene-2,6-dicarboxylic acid), and anhydrides or lower (such as $C_{1-5}$) alkyl esters of the foregoing.

The polycarboxylic acid may be a combination of a dicarboxylic acid and a tri- or higher carboxylic acid having a bridged structure or a branched structure. Examples of the tricarboxylic acid include aromatic carboxylic acids (such as 1,2,3-benzenetricarboxylic acid, 1,2,4-benzenetricarboxylic acid, and 1,2,4-naphthalenetricarboxylic acid), and anhydrides or lower (such as $C_{1-5}$) alkyl esters of the foregoing.

The polycarboxylic acid may be a combination of such a dicarboxylic acid, a dicarboxylic acid having a sulfonic group, and a dicarboxylic acid having an ethylenically double bond.

Such polycarboxylic acids may be used alone or in combination of two or more thereof.

Examples of the polyhydric alcohol include aliphatic diols (such as a linear aliphatic diol having a main chain having 7 or more and 20 or less carbon atoms). Examples of the aliphatic diols include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,14-eicosanedecanediol. Of these, preferred aliphatic diols include 1,8-octanediol, 1,9-nonanediol, and 1,10-decanediol.

The polyhydric alcohol may be a combination of a diol and a tri- or higher hydric alcohol having a bridged structure or a branched structure. Examples of the tri- or higher hydric alcohol include glycerol, trimethylolethane, trimethylolpropane, and pentaerythritol.

Such polyhydric alcohols may be used alone or in combination of two or more thereof.

The polyhydric alcohol preferably has an aliphatic diol content of 80 mol % or more, preferably 90 mol % or more.

The crystalline polyester resin preferably has a melting temperature of 50° C. or more and 100° C. or less, more preferably 55° C. or more and 90° C. or less, still more preferably 60° C. or more and 85° C. or less.

The melting temperature is determined from a differential scanning calorimetry (DSC) curve obtained by DSC, in accordance with "melting peak temperature" described in "How to Determine Melting Temperature" in JIS K7121-1987 "Testing Methods for Transition Temperatures of Plastics".

The crystalline polyester resin preferably has a weight-average molecular weight (Mw) of 6,000 or more and 35,000 or less.

As with the amorphous polyester, the crystalline polyester resin is obtained by, for example, a well-known production method.

From the viewpoint of rubbing resistance of images, the other binder resin preferably has a weight-average molecular weight (Mw) of 5,000 or more and 1,000,000 or less, more preferably 7,000 or more and 500,000 or less, particularly preferably 25,000 or more and 60,000 or less. The binder resin preferably has a number-average molecular weight (Mn) of 2,000 or more and 100,000 or less. The binder resin preferably has a polydispersity index Mw/Mn of 1.5 or more and 100 or less, more preferably 2 or more and 60 or less.

The weight-average molecular weight and the number-average molecular weight of the other binder resin are measured by gel permeation chromatography (GPC). The GPC molecular weight measurement is performed with a measurement apparatus that is a GPC HLC-8120GPC, manufactured by Tosoh Corporation, a column TSKgel SuperHM-M (15 cm), manufactured by Tosoh Corporation, and a tetrahydrofuran (THF) solvent. From the measurement result, the weight-average molecular weight and the number-average molecular weight are calculated using a molecular weight calibration curve created using monodispersed polystyrene standard samples.

The binder resin content relative to the total of the toner base particles is preferably 40 mass % or more and 95 mass % or less, more preferably 50 mass % or more and 90 mass % or less, still more preferably 60 mass % or more and 85 mass % or less.

When the toner base particles are white toner base particles, the binder resin content relative to the total of the white toner base particles is preferably 30 mass % or more and 85 mass % or less, more preferably 40 mass % or more and 60 mass % or less.

From the viewpoint of reducibility of gloss non-uniformity, in the binder resin, the hybrid resin content relative to the total mass of the binder resin is preferably 50 mass % or more and 100 mass % or less, more preferably 65 mass % or more and 100 mass % or less, still more preferably 80 mass % or more and 100 mass % or less, particularly preferably 90 mass % or more and 100 mass % or less.

Release Agent

Examples of the release agent include hydrocarbon waxes; natural waxes such as carnauba wax, rice wax, and candelilla wax; synthetic or mineral/petroleum waxes such as montan wax; and ester-based waxes such as fatty acid esters and montanic acid esters. However, the release agent is not limited to these.

The release agent preferably has a melting temperature of 50° C. or more and 110° C. or less, more preferably 60° C. or more and 100° C. or less.

The melting temperature is determined from a differential scanning calorimetry (DSC) curve obtained by DSC, in accordance with "melting peak temperature" described in "How to Determine Melting Temperature" in JIS K7121-1987 "Testing Methods for Transition Temperatures of Plastics".

From the viewpoint of reducibility of gloss non-uniformity, in the toner base particles, the release agent preferably has a domain size of 200 nm or more and 2,000 nm or less, more preferably 400 nm or more and 1,500 nm or less, still more preferably 500 nm or more and 1,300 nm or less, particularly preferably 600 nm or more and 1,200 nm or less.

The domain size (domain average size) of the release agent is a value measured by the following method.

Toner particles (or toner) are embedded by being mixed with an epoxy resin, and the epoxy resin is solidified. The solidified substance is cut with an ultramicrotome (Ultracut UCT, manufactured by Leica Microsystems GmbH), to prepare a thin sample having a thickness of 80 nm or more and 130 nm or less. Subsequently, the obtained thin sample is stained with ruthenium tetraoxide within a desiccator at 30° C. for 3 hours. Subsequently, an ultrahigh-resolution field-emission scanning electron microscope (FE-SEM, S-4800, manufactured by Hitachi High-Technologies Corporation) is used to obtain a SEM image of the stained thin sample.

In the sections of toner particles, the domains of the coloring agent, which are smaller than the domains of the release agent, are distinguishable on the basis of size. The domains of the coloring agent are also distinguishable on the basis of depth of color due to staining for the domains of the release agent.

In the SEM image, 30 toner particle sections in which the maximum size is 85% or more of the volume-average particle size of the toner particles are selected, and, in total, 100 domains of the stained release agent are observed. The maximum sizes of the domains are measured as the lengths of the domains, and are arithmetically averaged to determine the average size in the ° C. plane (domain size).

The release agent content relative to the total of the toner base particles is preferably 1 mass % or more and 20 mass % or less, more preferably 5 mass % or more and 15 mass % or less.

1-Amino-2-methoxybenzene

From the viewpoint of reducibility of gloss non-uniformity, the toner base particles preferably include 1-amino-2-methoxybenzene.

From the viewpoint of reducibility of gloss non-uniformity, in the electrostatic image developing toner according to the exemplary embodiment, the 1-amino-2-methoxybenzene content on mass basis relative to the total mass of the toner is preferably 0.1 ppm or more and 300 ppm or less, more preferably 0.5 ppm or more and 200 ppm or less, still more preferably 1 ppm or more and 100 ppm or less, particularly preferably 10 ppm or more and 70 ppm or less.

When PY74, which is aromatic, is used, PY74 and St in the resin tend to be in close proximity due to π-π electron interaction between π electrons of PY74 and π electrons of St in the resin. The StAc hybrid resin is used, and St in the toner is finely dispersed, so that PY74 also tends to be finely dispersed, and tends to be uniformly dispersed in the toner.

Thus, PY74 tends to be dispersed in the toner, so that the toner has increased elasticity, and exhibits high releasability even in the case of high TMA. In particular, when the yellow is present in the outermost surface of a fixed image, the toner exhibits high releasability and provides a high-quality image without gloss non-uniformity, compared with cases of not using PY74.

The 1-amino-2-methoxybenzene content in the exemplary embodiment is measured with a gas chromatograph analyzer (manufactured by SHIMADZU CORPORATION, model: GC-2010) and a column Rtx-1 (manufactured by Restek Corporation, P/N: 10157). Specifically, the measurement method is as follows.

A toner (100 mg) is weighed into a vial for HS-GCMS analysis, and sealed to prepare a measurement sample. The column temperature is held at 40° C. for 5 minutes, and the sample is heated to 250° C. at a rate of 15° C./min. From the area of the peak corresponding to 1-amino-2-methoxybenzene and a calibration curve, 1-amino-2-methoxybenzene is quantified, and the 1-amino-2-methoxybenzene content (ppm) relative to the total amount of the toner is calculated.

Coloring Agent

Examples of the coloring agent include various pigments such as carbon black, chrome yellow, Hansa yellow, benzidine yellow, threne yellow, quinoline yellow, pigment yellow, permanent orange GTR, pyrazolone orange, Vulcan orange, Watchung red, permanent red, brilliant carmine 3B, brilliant carmine 6B, Dupont oil red, pyrazolone red, lithol red, rhodamine B lake, lake red C, pigment red, rose bengal, aniline blue, ultramarine blue, calco oil blue, methylene blue chloride, phthalocyanine blue, pigment blue, phthalocyanine green, and malachite green oxalate; and various dyes such as acridine dyes, xanthene dyes, azo dyes, benzoquinone dyes, azine dyes, anthraquinone dyes, thioindigo dyes, dioxazine dyes, thiazine dyes, azomethine dyes, indigo dyes, phthalocyanine dyes, aniline black dyes, polymethine dyes, triphenylmethane dyes, diphenylmethane dyes, and thiazole dyes.

Such coloring agents may be used alone or in combination of two or more thereof.

The coloring agent may be optionally a surface-treated coloring agent, and may be used together with a dispersing agent. Such coloring agents may be used in combination of two or more thereof.

The coloring agent content relative to the total of the toner base particles is preferably, for example, 1 mass % or more and 30 mass % or less, more preferably 3 mass % or more and 15 mass % or less.

From the viewpoint of reducibility of gloss non-uniformity, the coloring agent is preferably a yellow coloring agent, particularly preferably C.I. Pigment Yellow 74.

Examples of yellow pigments include C.I. Pigment Yellow 1, 2, 3, 6, 12, 13, 14, 15, 16, 17, 55, 62, 65, 73, 74, 81, 83, 93, 94, 95, 97, 100, 104, 109, 110, 111, 120, 127, 128, 129, 138, 139, 151, 152, 154, 155, 166, 167, 168, 174, 175, 176, 180, 181, 185, 191, 191:1, 194, 213, 214, and 219;

C.I. Vat Yellow 1, 3, and 20;

mineral fast yellow, navel yellow, naphthol yellow S, Hansa yellow G, permanent yellow NCG; and C.I. Solvent Yellow 9, 17, 19, 24, 31, 35, 44, 58, 77, 79, 81, 82, 93, 98, 100, 102, 103, 104, 105, 112, 162, and 163.

Incidentally, 1-amino-2-methoxybenzene has a chemical structure partially similar to that of C.I. Pigment Yellow 74. When C.I. Pigment Yellow 74 is used as the coloring agent, 1-amino-2-methoxybenzene contained in C.I. Pigment Yellow 74 may be brought into the toner.

In the exemplary embodiment, when C.I. Pigment Yellow 74 is used, the C.I. Pigment Yellow 74 content relative to the total of the toner base particles is preferably 1 mass % or more and 30 mass % or less, more preferably 2 mass % or more and 20 mass % or less, particularly preferably 3 mass % or more and 15 mass % or less.

In the exemplary embodiment, when the toner particles are yellow toner particles, the coloring agent may be, for example, C.I. Pigment Yellow 74 alone or a combination of C.I. Pigment Yellow 74 and another coloring agent. The percentage of C.I. pigment Yellow 74 in the total mass of the coloring agent is preferably, for example, 50 mass % or more and 100 mass % or less, more preferably 80 mass % or more and 100 mass % or less, still more preferably 90 mass % or more and 100 mass % or less, particularly preferably 100 mass %.

Other Additives

Examples of other additives include publicly known additives such as magnetic substances, charge control agents, and inorganic powders. Such additives are contained, as internal additives, in toner base particles.

Characteristics Etc. of Toner Base Particles

The toner base particles may be toner base particles having a monolayer structure, or toner base particles (core-shell particles) including a core portion (core particle) and a cover layer (shell layer) covering the core portion, what is called, a core-shell structure. Toner base particles having a core-shell structure include, for example, a core portion including a binder resin and optionally a coloring agent, a release agent, and the like, and a cover layer including a binder resin.

In particular, from the viewpoint of reducibility of gloss non-uniformity, the toner base particles are preferably core-shell particles.

The toner preferably has a volume-average particle size ($D_{50v}$) of 2 μm or more and 10 μm or less, more preferably 4 μm or more and 8 μm or less.

The volume-average particle size of the toner is measured with a COULTER MULTISIZER II (manufactured by Beckman Coulter, Inc.) and with an electrolyte ISOTON-II (manufactured by Beckman Coulter, Inc.).

In the measurement, 0.5 mg or more and 50 mg or less of the measurement sample is added to 2 mL of a 5 mass % aqueous solution of a surfactant (preferably sodium alkylbenzene sulfonate) as a dispersing agent. The resultant solution is added to 100 mL or more and 150 mL or less of the electrolyte.

The electrolyte in which the sample has been suspended is subjected to dispersion treatment with an ultrasonic dispersing device for 1 minute. A COULTER MULTISIZER II is used to measure the particle sizes of particles in a particle size range of 2 μm or more and 60 μm or less through an aperture having an aperture size of 100 μm. The number of particles sampled is 50,000.

On the basis of measured particle sizes, a volume-based cumulative curve is drawn from smaller to larger particle sizes. A particle size corresponding to a cumulative value of 50% is defined as volume-average particle size $D_{50v}$.

In the exemplary embodiment, the toner base particles are not particularly limited in terms of average circularity; however, from the viewpoint of providing a toner that is easily cleaned off from an image carrier, the average circularity is preferably 0.91 or more and 0.98 or less, more preferably 0.94 or more and 0.98 or less, still more preferably 0.95 or more and 0.97 or less.

In the exemplary embodiment, the circularity of a toner base particle is "circumferential length of circle having the same area as projected image of particle"/"peripheral length of projected image of particle"; the average circularity of such toner base particles is a circularity corresponding to a cumulative value of 50% in the circularity distribution from smaller to larger circularities. The average circularity of toner base particles is determined by analyzing at least 3,000 toner base particles with a flow particle image analyzer.

The average circularity of toner base particles can be controlled by, for example, in the case of producing the toner base particles by an aggregation-coalescence process, in the fusion-coalescence step, adjusting the stirring rate for the dispersion liquid, or the temperature or holding time of the dispersion liquid.

External Additive

The electrostatic image developing toner according to the exemplary embodiment preferably includes an external additive.

Examples of the external additive include inorganic particles.

Examples of the material of the inorganic particles include $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO.SiO_2$, $K_2O.(TiO_2)_n$, $Al_2O_3.2SiO_2$, $CaCO_3$, $MgCO_3$, $BaSO_4$, and $MgSO_4$.

The inorganic particles as an external additive are preferably subjected to hydrophobic treatment so as to have hydrophobic surfaces. The hydrophobic treatment may be performed by, for example, immersing the inorganic particles in a hydrophobic treatment agent. The hydrophobic treatment agent is not particularly limited and examples thereof include silane coupling agents, silicone oil, titanate coupling agents, and aluminum coupling agents. These hydrophobic treatment agents may be used alone or in combination of two or more thereof.

The amount of hydrophobic treatment agent relative to 100 parts by mass of inorganic particles is preferably, for example, 1 part by mass or more and 10 parts by mass or less.

Other examples of the external additive include resin particles (resin particles of, for example, polystyrene, polymethyl methacrylate (PMMA), or melamine resin), and cleaning active agents (for example, metallic salts of higher fatty acids represented by zinc stearate, or particles of fluoropolymers).

The amount of external additive added relative to the total mass of the toner base particles is preferably, for example, 0.01 mass % or more and 5 mass % or less, more preferably 0.01 mass % or more and 2.0 mass % or less.

Method for Producing Toner

Hereinafter, a method for producing a toner according to the exemplary embodiment will be described.

The toner according to the exemplary embodiment is obtained by producing toner base particles, and subsequently adding, to the toner base particles, an external additive.

The toner base particles may be produced by a dry process (for example, a kneading-pulverization process) or a wet process (for example, an aggregation-coalescence process, a suspension-polymerization process, or a dissolution-suspension process). However, the method for producing the toner base particles is not particularly limited to these processes, and may be selected from publicly known processes. Among the above-described processes, the aggregation-coalescence process is preferably employed to produce the toner base particles.

In the case of the kneading-pulverization process, toner particles are preferably prepared in the following manner: a toner-forming material including a binder resin, a release agent, and optionally a coloring agent and 1-amino-2-methoxybenzene is kneaded to prepare a kneaded substance, and then the kneaded substance is pulverized.

Alternatively, specifically, for example, in the case of employing the aggregation-coalescence process to produce toner base particles, the following steps are performed: a step of preparing a resin-particle dispersion liquid in which resin particles serving as a binder resin are dispersed (resin-particle dispersion liquid preparation step); a step of, in the resin-particle dispersion liquid (optionally in a dispersion liquid obtained by mixing the resin-particle dispersion liquid with another particle dispersion liquid), aggregating resin particles (optionally other particles) to form aggregation particles (aggregation-particle formation step); and a step of heating the aggregation-particle dispersion liquid in which the aggregation particles are dispersed to fuse and coalesce the aggregation particles, to form toner base particles (fusion-coalescence step). Thus, the toner base particles are produced.

1-Amino-2-methoxybenzene may be added, in the aggregation-particle formation step, to the dispersion liquid.

Hereinafter, the steps will be described further in detail.

In the following description, a method of obtaining toner base particles including a coloring agent and a release agent will be described; however, the coloring agent and the release agent are optionally used. Obviously, an additive other than the coloring agent and the release agent may be used.

Resin-Particle Dispersion Liquid Preparation Step

A resin-particle dispersion liquid in which resin particles serving as a binder resin are dispersed is prepared together with, for example, a coloring-agent-particle dispersion liquid in which coloring agent particles are dispersed, and a release-agent-particle dispersion liquid in which release agent particles are dispersed.

The resin-particle dispersion liquid is prepared by, for example, dispersing resin particles in a dispersion medium using a surfactant.

Examples of the dispersion medium used for the resin-particle dispersion liquid include aqueous media.

Examples of the aqueous media include water such as distilled water and ion-exchanged water; and alcohols. These aqueous media may be used alone or in combination of two or more thereof.

Examples of the surfactant include anionic surfactants such as sulfuric acid ester salt-based surfactants, sulfonic acid salt-based surfactants, phosphoric acid ester-based surfactants, and soap-based surfactants; cationic surfactants such as amine salt-based surfactants and quaternary ammonium salt-based surfactants; and nonionic surfactants such as polyethylene glycol-based surfactants, alkylphenol ethylene-oxide adduct-based surfactants, and polyhydric alcohol-based surfactants. Of these, the anionic surfactants and the cationic surfactants may be used. A nonionic surfactant may be used in combination with an anionic surfactant or a cationic surfactant.

These surfactants may be used alone or in combination of two or more thereof.

Examples of the method of dispersing resin particles in a dispersion medium for preparation of the resin-particle dispersion liquid include commonly used dispersion methods using rotary-shear homogenizers or mills using media such as a ball mill, a sand mill, and a DYNO-MILL. Resin particles of some types may be dispersed in a dispersion medium by a phase inversion emulsification. This phase inversion emulsification is a method in which a resin to be dispersed is dissolved in a hydrophobic organic solvent in which the resin is soluble; a base is added to neutralize the organic continuous phase (O phase); an aqueous medium (W phase) is subsequently added, to cause phase inversion from W/O to O/W, to thereby disperse the resin in the form of particles in the aqueous medium.

The resin particles dispersed in the resin-particle dispersion liquid preferably have a volume-average particle size of, for example, 0.01 μm or more and 1 μm or less, more preferably 0.08 μm or more and 0.8 μm or less, still more preferably 0.1 μm or more and 0.6 μm or less.

The volume-average particle size of the resin particles is measured in the following manner. The resin particles are measured with a laser diffraction particle size distribution measurement system (for example, LA-700, manufactured by HORIBA, Ltd.) to obtain a particle size distribution. The particle size distribution is divided into particle size ranges (channels). Over these channels, a volume-based cumulative curve is drawn from the smaller to larger particle sizes. A particle size corresponding to a cumulative value of 50% relative to all the particles is determined as a volume-average particle size D50 v. Similarly, the volume-average particle sizes of particles in other dispersion liquids are also measured.

The resin particle content of the resin-particle dispersion liquid is preferably 5 mass % or more and 50 mass % or less, more preferably 10 mass % or more and 40 mass % or less.

As with the resin-particle dispersion liquid, for example, the coloring-agent-particle dispersion liquid and the release-agent-particle dispersion liquid are prepared. Specifically, the volume-average particle size, dispersion medium, dispersion process, and particle content in the resin-particle dispersion liquid apply to the coloring agent particles dispersed in the coloring-agent-particle dispersion liquid, and release agent particles dispersed in the release-agent-particle dispersion liquid.

Aggregation-Particle Formation Step

Subsequently, the resin-particle dispersion liquid, the coloring-agent-particle dispersion liquid, and the release-agent-particle dispersion liquid are mixed together. At this time, the dispersion liquids may be mixed with 1-amino-2-methoxybenzene.

In the resultant dispersion liquid mixture, the resin particles, the coloring agent particles, and the release agent particles are subjected to hetero-aggregation to thereby form aggregation particles that have a particle size close to the particle size of the target toner base particles, and that include the resin particles, the coloring agent particles, and the release agent particles.

Specifically, for example, an aggregation agent is added to the dispersion liquid mixture, and the dispersion liquid mixture is adjusted in terms of pH so as to become acidic (for example, a pH of 2 or more and 5 or less), and a dispersion stabilizing agent is optionally added; subsequently, heating is performed at a temperature close to the glass transition temperature of the resin particles (specifically, for example, resin particles' glass transition temperature—30° C. or more and resin particles' glass transition temperature—10° C. or less) to cause aggregation of the particles dispersed in the dispersion liquid mixture. Thus, the aggregation particles are formed.

The aggregation-particle formation step may be performed in the following manner: for example, to the dispersion liquid mixture being stirred with a rotary-shear homogenizer, the aggregation agent is added at room temperature (for example, 25° C.); the dispersion liquid mixture is adjusted in terms of pH so as to be acidic (for example, a pH of 2 or more and 5 or less); optionally, a dispersion stabilizing agent is added; and subsequently heating is performed.

Examples of the aggregation agent include surfactants of a polarity opposite to the polarity of the surfactant included in the dispersion liquid mixture, inorganic metal salts, and di- or higher valent metal complexes. When a metal complex is used as the aggregation agent, the amount of surfactant used is reduced and the charging characteristics are improved.

In addition to the aggregation agent, an additive that forms a complex or a similar bond with the metal ion of the aggregation agent may be optionally used. This additive is preferably a chelating agent.

Examples of the inorganic metal salts include metal salts such as calcium chloride, calcium nitrate, barium chloride, magnesium chloride, zinc chloride, aluminum chloride, and aluminum sulfate; and inorganic metal salt polymers such as polyaluminum chloride, polyaluminum hydroxide, and potassium polysulfide.

The chelating agent may be a water-soluble chelating agent. Examples of the chelating agent include oxycarboxylic acids such as tartaric acid, citric acid, and gluconic acid; and aminocarboxylic acids such as iminodiacetic acid (IDA), nitrilotriacetic acid (NTA), and ethylenediaminetetraacetic acid (EDTA).

The amount of aggregation agent added relative to 100 parts by mass of the resin particles is preferably 0.01 parts by mass or more and 5.0 parts by mass or less, more preferably 0.1 parts by mass or more and less than 3.0 parts by mass.

Fusion-Coalescence Step

Subsequently, the aggregation-particle dispersion liquid in which the aggregation particles are dispersed is heated, for example, at a temperature that is equal to or higher than the glass transition temperature of the resin particles (for example, equal to or higher than a temperature 30° C. to 50° C. higher than the glass transition temperature of the resin particles), and that is equal to or higher than the melting temperature of the release agent, to fuse and coalesce the aggregation particles. Thus, the toner base particles are formed.

In the fusion-coalescence step, at the temperature that is equal to or higher than the glass transition temperature of the resin particles and that is equal to or higher than the melting temperature of the release agent, the resin and the release agent are fused together. Subsequently, cooling is performed to obtain a toner.

The aspect ratio of the release agent in the toner can be adjusted: for example, during cooling, the liquid is held at or about the solidification temperature of the release agent to thereby cause crystal growth; or two or more release agents that are different in melting temperature are used to thereby promote crystal growth during cooling.

The steps having been described so far provide the toner base particles.

Alternatively, the toner base particles may be produced by the following steps: after the aggregation-particle dispersion liquid in which the aggregation particles are dispersed is obtained, a step of further mixing the aggregation-particle dispersion liquid and the resin-particle dispersion liquid in which resin particles are dispersed is performed, to cause aggregation such that the resin particles further adhere to the surfaces of the aggregation particles, to thereby form second aggregation particles; and a step of heating the second aggregation-particle dispersion liquid in which the second aggregation particles are dispersed is performed, to fuse and coalesce the second aggregation particles, to form core-shell toner base particles.

After the fusion-coalescence step is finished, the toner base particles formed in the liquid are subjected to publicly known steps including a washing step, a solid-liquid separation step, and a drying step to provide dry toner base particles. In the washing step, from the viewpoint of charging characteristics, displacement washing with ion-exchanged water may be sufficiently performed. From the viewpoint of productivity, the solid-liquid separation step may be performed by, for example, suction filtration or pressure filtration. From the viewpoint of productivity, the drying step may be performed by, for example, freeze drying, flash drying, fluidized-bed drying, or vibrating fluidized-bed drying.

To the obtained dry toner base particles, for example, an external additive is added and mixed. Thus, the toner according to the exemplary embodiment is produced. This mixing may be performed with, for example, a V blender, a Henschel mixer, or a Loedige Mixer. Furthermore, optionally, for example, a vibratory sieve or a pneumatic sifter may be used to remove coarse particles from the toner.

Electrostatic Image Developer

The electrostatic image developer according to the exemplary embodiment at least includes the toner according to the exemplary embodiment. The electrostatic image developer according to the exemplary embodiment may be a single-component developer including the toner according to the exemplary embodiment alone, or a two-component developer that is a mixture of the toner and a carrier.

The carrier is not particularly limited and may be selected from publicly known carriers. Examples of the carrier include a covered carrier in which the surfaces of cores composed of a magnetic powder are covered with a resin; a magnetic powder dispersed carrier in which a magnetic powder is added so as to be dispersed in a matrix resin; and a resin impregnated carrier in which a porous magnetic powder is impregnated with a resin. Each of the magnetic powder dispersed carrier and the resin impregnated carrier may also be a covered carrier in which cores are the particles of such a carrier and the surfaces of the cores are covered with a resin.

Examples of the material of the magnetic powder include magnetic metals such as iron, nickel, and cobalt and magnetic oxides such as ferrite and magnetite.

Examples of the cover resin and the matrix resin include polyethylene, polypropylene, polystyrene, polyvinyl acetate, polyvinyl alcohol, polyvinyl butyral, polyvinyl chloride, polyvinyl ether, polyvinyl ketone, vinyl chloride-vinyl acetate copolymers, styrene-acrylate copolymers, straight silicone resins containing organosiloxane bonds or modified resins thereof, fluororesins, polyester, polycarbonate, phenolic resins, and epoxy resins. The cover resin and the matrix resin may contain additives such as electroconductive particles. The electroconductive particles may be particles of, for example, a metal such as gold, silver, or copper, carbon black, titanium oxide, zinc oxide, tin oxide, barium sulfate, aluminum borate, or potassium titanate.

The process of covering the surfaces of cores with a resin may be performed by, for example, dissolving the cover resin and some additives (optionally used) in an appropriate solvent to prepare a cover-layer-forming solution and by covering the cores with this solution. The solvent is not particularly limited and may be selected in accordance with, for example, the type of the resin used and the coatability. Specific examples of the covering process with a resin include an immersion process of immersing cores in the cover-layer-forming solution; a spraying process of spraying the cover-layer-forming solution to the surfaces of cores; a fluidized bed process of spraying the cover-layer-forming solution to cores being floated with fluidizing air; and a kneader-coater process of mixing, within a kneader-coater, the cores of a carrier and the cover-layer-forming solution and subsequently removing the solvent.

The mixing ratio (mass ratio) of toner to carrier in the two-component developer is preferably toner:carrier=1:100 to 30:100, more preferably 3:100 to 20:100.

Image Forming Apparatus and Image Forming Method

An image forming apparatus and an image forming method according to the exemplary embodiment will be described.

The image forming apparatus according to the exemplary embodiment includes an image carrier, a charging device that charges the surface of the image carrier, an electrostatic image-forming device that forms an electrostatic image on the charged surface of the image carrier, a development device that contains an electrostatic image developer and uses the electrostatic image developer to develop, into a toner image, the electrostatic image formed on the surface of the image carrier, a transfer device that transfers the toner image formed on the surface of the image carrier onto the surface of a recording medium, and a fixing device that fixes the toner image transferred onto the surface of the recording medium. The electrostatic image developer employed is the electrostatic image developer according to the exemplary embodiment.

In the image forming apparatus according to the exemplary embodiment, an image forming method (the image forming method according to the exemplary embodiment) is performed that includes a charging step of charging the surface of an image carrier, an electrostatic image-forming step of forming an electrostatic image on the surface of the charged image carrier, a development step of using the electrostatic image developer according to the exemplary embodiment to develop, into a toner image, the electrostatic image formed on the surface of the image carrier, a transfer step of transferring the toner image formed on the surface of the image carrier onto the surface of a recording medium, and a fixing step of fixing the toner image transferred onto the surface of the recording medium.

The image forming apparatus according to the exemplary embodiment is applicable to publicly known image forming apparatuses such as a direct-transfer-system apparatus in which a toner image formed on the surface of an image carrier is directly transferred onto a recording medium; an intermediate-transfer-system apparatus in which a toner image formed on the surface of an image carrier is subjected to first transfer onto the surface of an intermediate transfer body, and the toner image transferred onto the surface of the intermediate transfer body is subjected to second transfer onto the surface of a recording medium; an apparatus including a cleaning device that cleans the surface of an image carrier after transfer of a toner image and before charging of the image carrier; and an apparatus including a discharging device that applies discharging light to the surface of an image carrier after transfer of a toner image and before charging of the image carrier, to thereby discharge the charged surface.

When the image forming apparatus according to the exemplary embodiment is an intermediate-transfer-system apparatus, the transfer device includes, for example, an intermediate transfer body onto the surface of which a toner image is transferred, a first transfer device that performs first transfer of transferring the toner image formed on the surface of the image carrier onto the surface of the intermediate transfer body, and a second transfer device that performs second transfer of transferring the toner image transferred onto the surface of the intermediate transfer body, onto the surface of a recording medium.

In the image forming apparatus according to the exemplary embodiment, for example, a part including the development device may have a cartridge structure (process cartridge) that is attachable to and detachable from the image forming apparatus. The process cartridge is preferably, for example, a process cartridge including a development device containing the electrostatic image developer according to the exemplary embodiment.

Hereinafter, a non-limiting example of the image forming apparatus according to the exemplary embodiment will be described. In the following description, several parts in FIG. 2 will be described, but redundant descriptions will be omitted.

Figure 2:
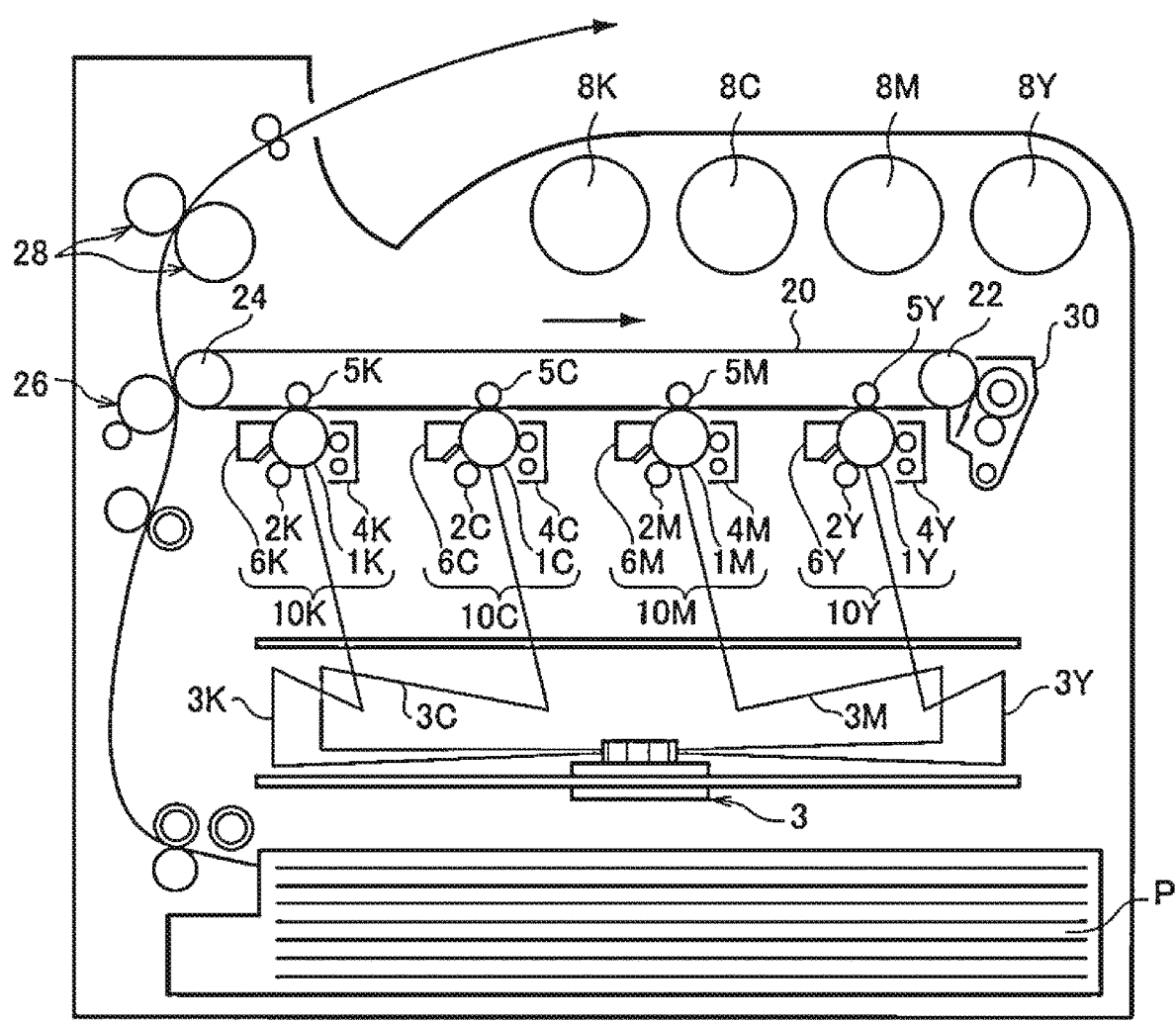
FIG. 2 is a schematic configuration view illustrating an image forming apparatus according to an exemplary embodiment.

FIG. 2 is a schematic configuration view illustrating the image forming apparatus according to the exemplary embodiment.

In FIG. 2, the image forming apparatus includes first to fourth electrophotographic image forming units 10Y, 10M, 10C, and 10K (image forming devices) that respectively output images of colors of yellow (Y), magenta (M), cyan (C), and black (K) on the basis of color separation image data. These image forming units (hereafter, also simply referred to as "units") 10Y, 10M, 10C, and 10K are arranged at predetermined intervals in the horizontal direction. These units 10Y, 10M, 10C, and 10K may be process cartridges that are attachable to and detachable from the image forming apparatus.

Over the units 10Y, 10M, 10C, and 10K, an intermediate transfer belt (an example of the intermediate transfer body) 20 is disposed to extend through the units. The intermediate transfer belt 20 is wrapped round a drive roller 22 and a support roller 24, which are in contact with the inner surface of the intermediate transfer belt 20, so as to run in a direction from the first unit 10Y to the fourth unit 10K. The support roller 24 is urged by a spring or the like (not shown) in a direction away from the drive roller 22, so that the intermediate transfer belt 20 is stretched to be wrapped round the rollers. On the image carrying surface side of the intermediate transfer belt 20, an intermediate transfer belt cleaning device 30 is disposed so as to face the drive roller 22.

To development units (examples of the development device) 4Y, 4M, 4C, and 4K of the units 10Y, 10M, 10C, and 10K, toners of yellow, magenta, cyan, and black contained in toner cartridges 8Y, 8M, 8C, and 8K are respectively supplied.

The first to fourth units 10Y, 10M, 10C, and 10K have substantially the same configuration and operations. As a representative example of these units, the first unit 10Y will be described, which is disposed at the upstream position in the running direction of the intermediate transfer belt and forms yellow images.

The first unit 10Y has a photoconductor 1Y serving as an image carrier. Around the photoconductor 1Y, the following units are sequentially disposed: a charging roller (an example of the charging device) 2Y that charges in advance the surface of the photoconductor 1Y to a predetermined potential; an exposure unit (an example of the electrostatic image-forming device) 3 that exposes the charged surface to a laser beam 3Y emitted in accordance with image signals of color separation to form an electrostatic image; a development unit (an example of the development device) 4Y that supplies the charged toner to the electrostatic image to develop the electrostatic image; a first transfer roller (an example of the first transfer device) 5Y that transfers the developed toner image onto the intermediate transfer belt 20; and a photoconductor cleaning unit (an example of the image carrier cleaning device) 6Y that cleans off remaining toner on the surface of the photoconductor 1Y after the first transfer.

The first transfer roller 5Y is disposed inside of the intermediate transfer belt 20 so as to face the photoconductor 1Y. To the first transfer rollers 5Y, 5M, 5C, and 5K of the units, bias power supplies (not shown) that apply first transfer bias are connected. Each bias power supply is controlled by a controller (not shown) such that the value of the transfer bias applied to the first transfer roller is changed.

Hereinafter, operations of forming a yellow image in the first unit 10Y will be described.

Before the operations are started, the charging roller 2Y charges the surface of the photoconductor 1Y at a potential of −600 V to −800 V.

The photoconductor 1Y is formed such that, on an electroconductive (for example, having a volume resistivity at 20° C. of $1 \times 10^{-6}$ Ωcm or less) substrate, a photosensitive layer is formed. This photosensitive layer normally has a high resistivity (resistivity of ordinary resin); but, when irradiated with a laser beam, the region irradiated with the laser beam is subjected to a change in the resistivity. The charged surface of the photoconductor 1Y is irradiated with a laser beam 3Y from the exposure unit 3 in accordance with image data for yellow sent from the controller (not shown). As a result, an electrostatic image having a yellow image pattern is formed on the surface of the photoconductor 1Y.

The electrostatic image is an image formed on the basis of charging on the surface of the photoconductor 1Y, what is called, a negative latent image formed in the following manner: the laser beam 3Y causes a decrease in the resistivity of the irradiated region of the photosensitive layer, so that charges on the surface of the photoconductor 1Y flow out, whereas charges in the other region not irradiated with the laser beam 3Y remain the same.

The electrostatic image formed on the photoconductor 1Y is rotated, with the photoconductor 1Y being driven, to the predetermined development site. At the development site, the electrostatic image on the photoconductor 1Y is visualized by being developed into a toner image by the development unit 4Y.

The development unit 4Y contains, for example, an electrostatic image developer at least including a yellow toner and a carrier. The yellow toner is stirred within the development unit 4Y so that it is frictionally charged to have charges of the same polarity (negative) as that of the charges on the photoconductor 1Y, and the yellow toner is held on a developer roller (an example of a developer holder). As the surface of the photoconductor 1Y passes over the development unit 4Y, the yellow toner electrostatically adheres to the discharged latent image region on the surface of the photoconductor 1Y, so that the latent image is developed with the yellow toner. The photoconductor 1Y on which the yellow toner image is formed is then continuously driven at the predetermined rate, so that the toner image developed on the photoconductor 1Y is transported to the predetermined first transfer site.

When the yellow toner image on the photoconductor 1Y is transported to the first transfer site, the first transfer bias is applied to the first transfer roller 5Y, so that the electrostatic force from the photoconductor 1Y toward the first transfer roller 5Y affects the toner image, to transfer the toner image on the photoconductor 1Y onto the intermediate transfer belt 20. The transfer bias applied at this time has a positive polarity, which is opposite to the negative polarity of the toner; in the first unit 10Y, the transfer bias is controlled by a controller (not shown) to, for example, +10 μA. The remaining toner on the photoconductor 1Y is removed and collected by the photoconductor cleaning unit 6Y.

In the downstream units including the second unit 10M, the first transfer biases applied to the first transfer rollers 5M, 5C, and 5K are also controlled as in the first unit.

The intermediate transfer belt 20 onto which the yellow toner image is transferred at the first unit 10Y is conveyed sequentially through the second to the fourth units 10M, 10C, and 10K, so that the toner images of the colors are stacked to achieve multiple transfer.

The intermediate transfer belt 20 passed through the first to fourth units to achieve multiple transfer of toner images of four colors is moved to the second transfer site constituted by the intermediate transfer belt 20, the support roller 24 in contact with the inner surface of the intermediate transfer belt, and the second transfer roller (an example of the second transfer device) 26 disposed on the image carrying surface side of the intermediate transfer belt 20. On the other hand, recording paper (an example of the recording medium) P is fed via a feeding mechanism, at a predetermined timing, to the nip between the second transfer roller 26 and the intermediate transfer belt 20; and a second transfer bias is applied to the support roller 24. The transfer bias applied at this time has a negative polarity, which is the same polarity as the negative polarity of the toner; the electrostatic force from the intermediate transfer belt 20 toward the recording paper P affects the toner image, so that the toner image on the intermediate transfer belt 20 is transferred onto the recording paper P. The second transfer bias applied at this time is adjusted depending on the resistance of the second transfer site detected by a resistance detector (not shown), and controlled in terms of voltage.

The recording paper P onto which the toner images are transferred is sent to, in a fixing unit (an example of the fixing device) 28, the press-contact portion (nip) between a pair of fixing rollers; the toner images are fixed on the recording paper P, to form a fixed image. The recording paper P on which the color image has been fixed is conveyed to the exit part. Thus, the series of operations of forming a color image are finished.

Examples of the recording paper P onto which toner images are transferred include plain paper used for electrophotographic copiers, printers, and the like. Examples of the recording medium include, in addition to the recording paper P, OHP sheets. In order to provide more smooth surfaces of fixed images, the recording paper P also preferably has a smooth surface; preferred examples include coat paper provided by coating the surface of plain paper with resin or the like, and art paper for printing.

Process Cartridge and Toner Cartridge

The process cartridge according to the exemplary embodiment includes a development device that contains the electrostatic image developer according to the exemplary embodiment, and that uses the electrostatic image developer to develop, into a toner image, an electrostatic image formed on the surface of the image carrier, and is attachable to and detachable from an image forming apparatus.

The process cartridge according to the exemplary embodiment may include the development device and optionally, for example, at least one selected from other devices such as an image carrier, a charging device, an electrostatic image-forming device, and a transfer device.

Hereinafter, a non-limiting example of the process cartridge according to the exemplary embodiment will be described. In the following description, several parts in FIG. 3 will be described, but redundant descriptions will be omitted.

Figure 3:
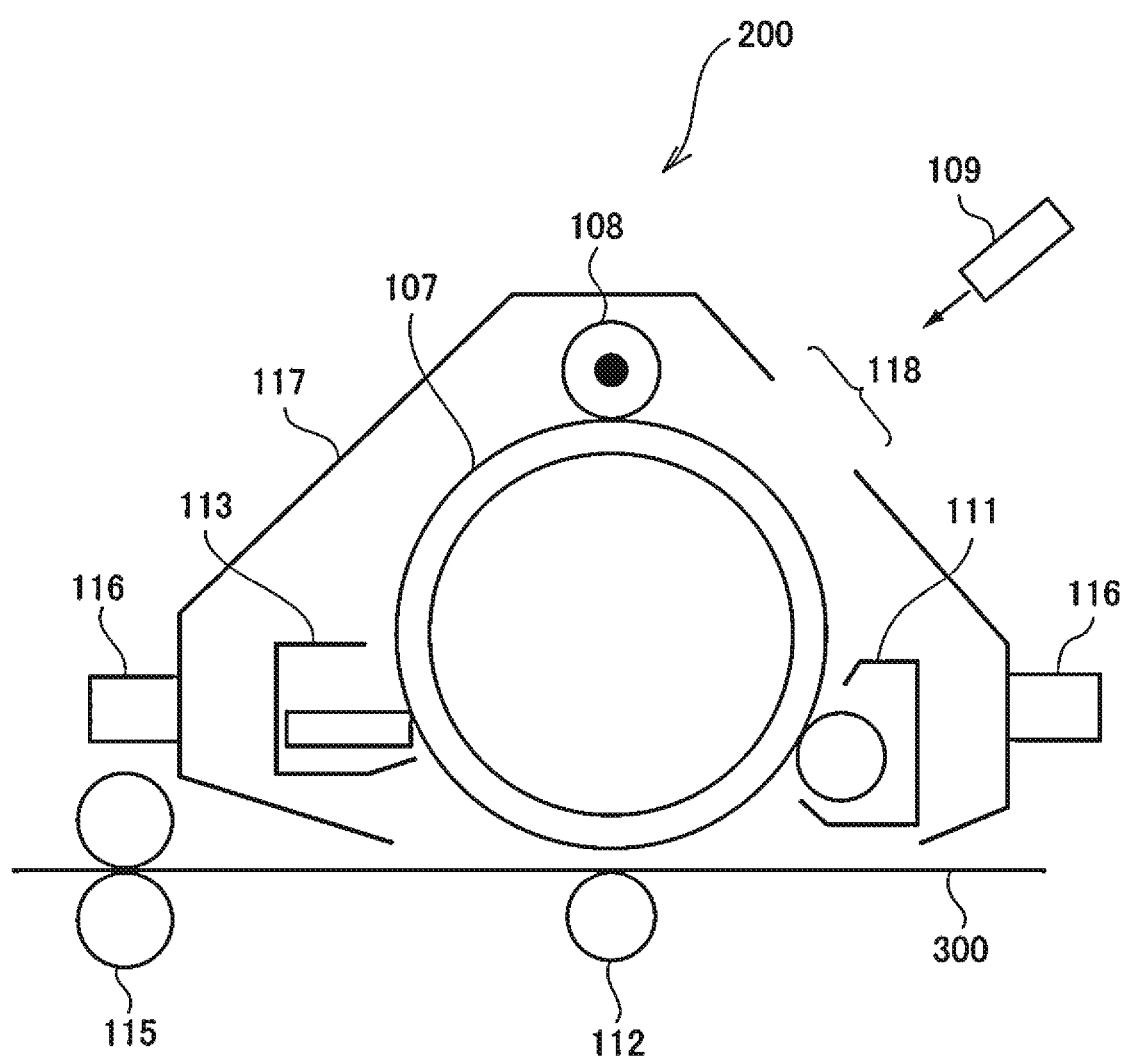
FIG. 3 is a schematic configuration view illustrating a process cartridge according to an exemplary embodiment.

FIG. 3 is a schematic configuration view illustrating an example of the process cartridge according to the exemplary embodiment.

In FIG. 3, a process cartridge 200 has, for example, the following configuration and is provided as a cartridge: a housing 117 having an attachment rail 116 and an opening 118 for exposure is used to integrate and hold a photoconductor 107 (an example of the image carrier) and other devices disposed around the photoconductor 107 that are a charging roller 108 (an example of the charging device), a development unit 111 (an example of the development device), and a photoconductor cleaning unit 113 (an example of the cleaning device).

FIG. 3 also illustrates an exposure unit (an example of the electrostatic image-forming device) 109, a transfer unit (an example of the transfer device) 112, a fixing unit (an example of the fixing device) 115, and recording paper (an example of the recording medium) 300.

Hereinafter, the toner cartridge according to the exemplary embodiment will be described.

The toner cartridge according to the exemplary embodiment contains the toner according to the exemplary embodiment and is attachable to and detachable from an image forming apparatus. The toner cartridge contains supplemental toner to be supplied to a development device disposed within the image forming apparatus.

In the image forming apparatus in FIG. 2, the toner cartridges 8Y, 8M, 8C, and 8K are attachable to and detachable from the image forming apparatus. The development units 4Y, 4M, 4C, and 4K are respectively connected to the toner cartridges of corresponding colors via toner supply pipes (not shown). When the toner in a toner cartridge has been almost used up, this toner cartridge is replaced by a new one.

EXAMPLES

Hereinafter, examples of exemplary embodiments according to the present disclosure will be described; however, the present disclosure is not limited to the following examples. In the following description, "part" and "%" are all based on mass unless otherwise specified.

The arithmetic average particle size of a specific external additive and the amount of the specific external additive in a free state, and the content of 5'-chloro-3-hydroxy-2'-methoxy-2-naphtanilide are measured by the above-described methods.

Production of Styrene-(Meth)Acrylic-Modified Polyester Resin Preparation of Styrene-Acrylic-Modified Polyester Resin Particle Dispersion Liquid (SPE 1)

A four-neck flask equipped with a nitrogen inlet, a dehydration tube, a stirring device, and a thermocouple is purged with nitrogen, charged with 5,670 parts of polyoxypropylene (2.2)-2,2-bis(4-hydroxyphenyl)propane, 585 parts of polyoxyethylene(2.0)-2,2-bis(4-hydroxyphenyl)propane, 2,450 parts of terephthalic acid, and 44 parts of tin(II) di(2-ethylhexanoate), heated to 235° C. in a nitrogen atmosphere under stirring and held for 5 hours, and then subjected to a reduced pressure within the flask and held at 8.0 kPa for 1 hour. The pressure is turned back to the atmospheric pressure, then the flask contents are cooled to 190° C.; 42 parts of fumaric acid and 207 parts of trimellitic acid are added; the flask contents are held at 190° C. for 2 hours, and then heated to 210° C. over 2 hours. The flask contents are subjected to a reduced pressure within the flask to 8.0 kPa and held for 4 hours, to obtain an amorphous polyester resin A (polyester segment).

Subsequently, a four-neck flask equipped with a condenser, a stirring device, and a thermocouple is charged with 800 parts of the amorphous polyester resin A, and stirred at 200 rpm in a nitrogen atmosphere. Subsequently, as addition-polymerizable monomers, 100 parts of styrene, 82 parts of ethyl acrylate, 16 parts of acrylic acid, 2 parts of 1,10-decanediol diacrylate, and 1,000 parts of toluene are added, and mixing is further performed for 30 minutes.

Furthermore, 6 parts of polyoxyethylene alkyl ether (nonionic surfactant, trade name: EMULGEN 430, manufactured by Kao Corporation), 40 parts of a 15% aqueous solution of sodium dodecylbenzenesulfonate (anionic surfactant, trade name: NEOPELEX G-15, manufactured by Kao Corporation), and 233 parts of 5% potassium hydroxide are added; the flask contents are, under stirring, heated to 95° C. and melted, and mixed at 95° C. for 2 hours, to obtain a resin mixture solution.

Subsequently, to the resin mixture solution under stirring, 1,145 parts of deionized water is dropped at 6 parts/min, to obtain an emulsion. Subsequently, the obtained emulsion is cooled to 25° C., passed through a 200-mesh metal screen, and mixed with deionized water so as to have a solid content of 30%, to obtain a styrene-acrylic-modified polyester resin particle dispersion liquid (SPE 1).

In the synthesized styrene-acrylic-modified polyester resin, the mass ratio (styrene-acrylic copolymer segment/polyester resin segment) of the styrene-acrylic copolymer segment to the polyester resin segment is 10/90.

Preparation of Amorphous Polyester Resin B (Polyester Segment)

An amorphous polyester resin B (polyester segment) is prepared as in the amorphous polyester resin A except that heating to 235° C. and holding for 5 hours in the preparation of the amorphous polyester resin A are changed to heating to 235° C. and holding for 2 hours.

Preparation of Amorphous Polyester Resin C (Polyester Segment)

An amorphous polyester resin C (polyester segment) is prepared as in the amorphous polyester resin A except that heating to 235° C. and holding for 5 hours in the preparation of the amorphous polyester resin A are changed to heating to 235° C. and holding for 3 hours.

Preparation of Amorphous Polyester Resin D (Polyester Segment)

An amorphous polyester resin D (polyester segment) is prepared as in the amorphous polyester resin A except that heating to 235° C. and holding for 5 hours in the preparation of the amorphous polyester resin A are changed to heating to 235° C. and holding for 6 hours.

Preparation of Amorphous Polyester Resin E (Polyester Segment)

An amorphous polyester resin E (polyester segment) is prepared as in the amorphous polyester resin A except that heating to 235° C. and holding for 5 hours in the preparation of the amorphous polyester resin A are changed to heating to 235° C. and holding for 7 hours.

Preparation of Amorphous Polyester Resin F (Polyester Segment)

An amorphous polyester resin F (polyester segment) is prepared as in the amorphous polyester resin A except that 42 parts of fumaric acid and 207 parts of trimellitic acid added in the preparation of the amorphous polyester resin A are changed to 145 parts of fumaric acid and 104 parts of trimellitic acid.

Preparation of Amorphous Polyester Resin G (Polyester Segment)

An amorphous polyester resin G (polyester segment) is prepared as in the amorphous polyester resin A except that 42 parts of fumaric acid and 207 parts of trimellitic acid added in the preparation of the amorphous polyester resin A are changed to 12 parts of fumaric acid and 237 parts of trimellitic acid.

Preparation of Styrene-Acrylic-Modified Polyester Resin Particle Dispersion Liquids (SPE 2 to SPE 17)

SPE 2 to SPE 17 are prepared in accordance with the composition proportions in Table 1 and under the same conditions as in SPE 1.

Preparation of Polyester-Modified Styrene-Acrylic Resin Particle Dispersion Liquid (SPE 18)

A four-neck flask equipped with a condenser, a stirring device, and a thermocouple is charged with 1000 parts of butyl acetate, and heated to 110° C. under stirring.

Subsequently, a mixture of 200 parts of styrene, 730 parts of butyl acrylate, 10 parts of 1,10-decanediol diacrylate, 60 parts of acrylic acid, and 6 parts of azobisisobutyronitrile is dropped over 2 hours into the four-neck flask under stirring, and the flask contents are held at 110° C. for 4 hours under stirring. Subsequently, cooling is performed to room temperature, to obtain a styrene-acrylic resin A (styrene-acrylic segment).

Subsequently, a four-neck flask equipped with a nitrogen inlet, a dehydration tube, a stirring device, and a thermocouple is purged with nitrogen, charged with 138 parts of polyoxypropylene(2.2)-2,2-bis(4-hydroxyphenyl)propane, 32 parts of polyoxyethylene(2.0)-2,2-bis(4-hydroxyphenyl)propane, 88 parts of terephthalic acid, and 1 part of tin(II) di(2-ethylhexanoate), heated to 235° C. in a nitrogen atmosphere under stirring and held for 5 hours, subsequently subjected to a reduced pressure within the flask and held at 8.0 kPa for 5 hours.

Furthermore, 3 parts of polyoxyethylene alkyl ether (nonionic surfactant, trade name: EMULGEN 430, manufactured by Kao Corporation), 20 parts of a 15% aqueous solution of sodium dodecylbenzenesulfonate (anionic surfactant, trade name: NEOPELEX G-15, manufactured by Kao Corporation), and 116 parts of 5% potassium hydroxide are added; the flask contents are heated to 95° C. and melted under stirring, and mixed at 95° C. for 2 hours, to obtain a resin mixture solution.

Subsequently, to the resin mixture solution under stirring, 1,000 parts of deionized water is dropped at 6 parts/min, to obtain an emulsion. Subsequently, the obtained emulsion is cooled to 25° C., passed through a 200-mesh metal screen, and mixed with deionized water so as to have a solid content of 30%, to obtain a polyester-modified styrene-acrylic resin particle dispersion liquid (SPE 18).

Preparation of Polyester-Modified Styrene-Acrylic Resin Particle Dispersion Liquid (SPE 19)

A polyester-modified styrene-acrylic resin particle dispersion liquid (SPE 19) is prepared as in the polyester-modified styrene-acrylic resin particle dispersion liquid (SPE 18) except that 730 parts of butyl acrylate and 10 parts of 1,10-decanediol diacrylate in the preparation of the polyester-modified styrene-acrylic resin particle dispersion liquid (SPE 18) are changed to 720 parts of butyl acrylate and 20 parts of 1,10-decanediol diacrylate.

Preparation of Polyester-Modified Styrene-Acrylic Resin Particle Dispersion Liquid (SPE 20)

A polyester-modified styrene-acrylic resin particle dispersion liquid (SPE 20) is prepared as in the polyester-modified styrene-acrylic resin particle dispersion liquid (SPE 18) except that 730 parts of butyl acrylate and 10 parts of 1,10-decanediol diacrylate in the preparation of the polyester-modified styrene-acrylic resin particle dispersion liquid (SPE 18) are changed to 700 parts of butyl acrylate and 40 parts of 1,10-decanediol diacrylate.

Preparation of Styrene-Acrylic-Modified Polyester Resin

A four-neck flask equipped with a nitrogen inlet, a dehydration tube, a stirring device, and a thermocouple is purged with nitrogen, charged with 5,670 parts of polyoxypropylene (2.2)-2,2-bis(4-hydroxyphenyl)propane, 585 parts of polyoxyethylene(2.0)-2,2-bis(4-hydroxyphenyl)propane, 2,450 parts of terephthalic acid, and 44 parts of tin(II) di(2-ethylhexanoate), heated to 235° C. and held for 5 hours in a nitrogen atmosphere under stirring, subsequently subjected to a reduced pressure within the flask and held at 8.0 kPa for 1 hour. After the pressure is turned back to the atmospheric pressure, cooling to 190° C. is performed; 42 parts of fumaric acid and 207 parts of trimellitic acid are added; the flask contents are held at 190° C. for 2 hours, and then heated to 210° C. over 2 hours. Furthermore, the flask contents are subjected to a reduced pressure, and held at 8.0 kPa for 4 hours, to obtain an amorphous polyester resin A (polyester segment).

Subsequently, a four-neck flask equipped with a condenser, a stirring device, and a thermocouple is charged with 800 parts of the amorphous polyester resin A, and stirred at 200 rpm in a nitrogen atmosphere. After that, as addition-polymerizable monomers, 100 parts of styrene, 79 parts of ethyl acrylate, 16 parts of acrylic acid, 5 parts of 1,10-decanediol diacrylate, 6 parts of azobisisobutyronitrile, and 1,000 parts of toluene are added, and mixing is further performed for 30 minutes.

Subsequently, the flask contents are heated to 105° C., subsequently held at 105° C. for 4 hours, and then at the same temperature subjected to a reduced pressure to remove toluene, to obtain a styrene-acrylic-modified polyester resin (SPE 21).

Preparation of Comparative Resin-Particle Dispersion Liquid (P1)

Bisphenol A ethylene oxide 2 mol adduct: 3 molar parts
Ethylene glycol: 7.5 molar parts
Terephthalic acid: 8 molar parts
Dodecenylsuccinic acid: 1 molar part To a flask equipped with a stirring device, a nitrogen inlet, a temperature sensor, and a rectifying column, the above-described components are added, heated to 240° C. over 1 hour; the reaction system is stirred, and then dibutyl tin oxide is added in an amount of 3.0 parts relative to 100 parts of the total amount of the monomers. The reaction system is held for 6 hours while generated water is driven off, subsequently subjected to a reduced pressure within the flask, and held at 8.0 kPa for 1 hour.

Subsequently, the pressure within the flask is turned back to the atmospheric pressure; then cooling to 190° C. is performed; 2 molar parts of succinic acid and 0.4 molar parts of trimellitic acid are added; the reaction system is held at 190° C. for 2 hours, and then heated to 210° C. over 2 hours. The reaction system is subjected to a reduced pressure within the flask, and held at 8.0 kPa for 4 hours, and subsequently alcohol is driven off, to obtain an amorphous polyester resin.

Subsequently, to the obtained 1,000 parts of the amorphous polyester resin, 6 parts of polyoxyethylene alkyl ether (nonionic surfactant, EMULGEN 430, manufactured by Kao Corporation), 40 parts of a 15% aqueous solution of sodium dodecylbenzenesulfonate (anionic surfactant, NEOPELEX G-15, manufactured by Kao Corporation), 233 parts of 5% potassium hydroxide, and 1,145 parts of ion-exchanged water are dropped at 6 parts/min, to obtain an emulsion. Subsequently the emulsion is cooled to 25° C., passed through a 200-mesh metal screen, and mixed with ion-exchanged water so as to have a solid content concentration of 30%, to obtain a resin-particle dispersion liquid (P1) in which polyester resin particles are dispersed.

Preparation of Comparative Styrene-Acrylic Resin Particle Dispersion Liquid (S1)

Preparation of Styrene-Acrylic Resin Dispersion Liquid

Styrene: 308 parts
Butyl acrylate: 100 parts
Acrylic acid: 4 parts
Dodecanethiol: 3 parts
Propanediol diacrylate: 1.5 parts The above-described components are mixed to achieve dissolution. The resultant mixture is added to an aqueous solution in which 4 parts of an anionic surfactant (manufactured by DAI-ICHI KOGYO SEIYAKU CO., LTD., NEOGEN SC) is dissolved in 550 parts of ion-exchanged water, and emulsified within a flask. Subsequently, while the emulsion is mixed for 10 minutes, an aqueous solution in which 6 parts of ammonium persulfate is dissolved in 350 parts of ion-exchanged water is added to the emulsion; the flask is purged with nitrogen, subsequently the flask contents under stirring are heated in an oil bath until the flask contents reach 75° C., and, in this state, emulsification polymerization is caused for 5 hours. As a result, a styrene-acrylic resin-particle dispersion liquid (S1) (resin particle concentration: 30%) is provided in which resin particles having an average particle size of 195 nm and a weight-average molecular weight (Mw) of 41,000 are dispersed.

Preparation of Coloring-Agent-Particle Dispersion Liquid (1)

C.I. Pigment Yellow 74 (commercially available product, 70 parts by mass), 1 part by mass of an anionic surfactant (manufactured by DAI-ICHI KOGYO SEIYAKU CO., LTD., NEOGEN RK), and 200 parts by mass of ion-exchanged water are mixed, and dispersed with a homogenizer (manufactured by IKA-WERKE GMBH & CO. KG, ULTRA-TURRAX T50) for 10 minutes. Ion-exchanged water is added such that the dispersion liquid has a solid content of 20 mass %, to obtain a coloring-agent-particle dispersion liquid. In the coloring-agent-particle dispersion liquid, the coloring agent particles have a volume-average particle size of 190 nm.

Preparation of Coloring-Agent-Particle Dispersion Liquid (2)

A coloring-agent-particle dispersion liquid (2) is prepared as with the preparation of the coloring-agent-particle dispersion liquid (1) except that the coloring agent is changed to C.I Pigment Yellow 75 (commercially available product).

Preparation of Coloring-Agent-Particle Dispersion Liquid (3)

A coloring-agent-particle dispersion liquid (3) is prepared as with the preparation of the coloring-agent-particle dispersion liquid (1) except that the coloring agent is changed to C.I Pigment Yellow 83 (commercially available product).

Preparation of Release-Agent-Particle Dispersion Liquid (1)

Paraffin wax (HNP-9, manufactured by NIPPON SEIRO CO., LTD., 50 parts by mass), 5 parts by mass of an anionic surfactant (manufactured by DAI-ICHI KOGYO SEIYAKU CO., LTD., NEOGEN RK), and 200 parts by mass of ion-exchanged water are mixed and heated to 110° C., dispersed with a homogenizer (manufactured by IKA-WERKE GMBH & CO. KG, ULTRA-TURRAX T50), and subsequently subjected to dispersion treatment with a Manton-Gaulin high-pressure homogenizer (Gaulin company), to obtain a release-agent-particle dispersion liquid. The release-agent-particle dispersion liquid has a solid content of 26 mass %. The release agent particles have a volume-average particle size of 150 nm.

Preparation of Release-Agent-Particle Dispersion Liquid (2)

A release-agent-particle dispersion liquid (2) is prepared as with the preparation of the release-agent-particle dispersion liquid (1) except that the wax is changed to polyethylene wax (PW600, manufactured by TOYO ADL CORPORATION).

Preparation of Release-Agent-Particle Dispersion Liquid (3)

A release-agent-particle dispersion liquid (3) is prepared as with the preparation of the release-agent-particle dispersion liquid (1) except that the wax is changed to Fischer-Tropsch wax (FT-105, manufactured by NIPPON SEIRO CO., LTD.).

Example 1

Preparation of Toner (1)

Ion-exchanged water: 215 parts

Styrene-acrylic-modified polyester resin particle dispersion liquid (SPE 1): 230 parts Coloring-agent-particle dispersion liquid (1): 20 parts (solid content: 20%)

Anionic surfactant (DAI-ICHI KOGYO SEIYAKU CO., LTD., NEOGEN RK, 20%): 2.8 parts The above-described components are charged into a 3-liter reaction vessel equipped with a thermometer, a pH meter, and a stirring device, and held at 30° C. under stirring at 150 rpm for 30 minutes under external temperature control using a heating mantle. Subsequently, a 0.3 N (=mol/L) nitric acid aqueous solution is added such that pH in the aggregation step is adjusted to 3.0.

Under dispersing using a homogenizer (manufactured by IKA JAPAN, ULTRA-TURRAX T50), a PAC aqueous solution in which 0.7 parts of PAC (manufactured by Oji Paper Co., Ltd., 30% powder product) is dissolved in 7 parts of ion-exchanged water is added. Subsequently, the solution under stirring is heated to 50° C.; the particle size is measured with a COULTER MULTISIZER II (aperture size: 50 μm, manufactured by Coulter, Inc.), and the volume-average particle size is found to be 5.0 μm. Subsequently, a mixture is further added that includes 30 parts of the styrene-acrylic-modified polyester resin particle dispersion liquid (SPE 1) and 15 parts of the release-agent-particle dispersion liquid. After 30 minutes elapsed, 47 parts of the styrene-acrylic-modified polyester resin particle dispersion liquid (SPE 1) is further added, to cause the release agent dispersion liquid and the resin particles to adhere to the surfaces of the aggregation particles (to form shell structures).

Subsequently, 20 parts of a 10% aqueous solution of NTA (nitrilotriacetic acid) metal salt (CHELEST 70, manufactured by CHELEST CORPORATION) is added, and then a 1 N (mol/L) sodium hydroxide aqueous solution is used to adjust the pH to 9.0. Subsequently, the solution is heated to 90° C. at a heating rate of 0.05° C./min, held at 90° C. for 3 hours, and then cooled to 30° C. Subsequently, the solution is heated at a heating rate of 0.05° C./min to 87° C., which is equal to or higher than the melting point of the release agent, held for 30 minutes, then slowly cooled at 1° C./min to 30° C., and then filtered to obtain crude toner particles. These are further repeatedly subjected to a washing process of re-dispersion in ion-exchanged water and filtration until the filtrate has an electric conductivity of 20 μS/cm or less, subsequently subjected to vacuum drying in an oven at 40° C. for 5 hours, to obtain toner particles (1).

Relative to 100 parts of the obtained toner particles (1), 1.5 parts of hydrophobic silica (manufactured by NIPPON AEROSIL CO., LTD., RY50) and 1.0 part of hydrophobic titanium oxide (manufactured by NIPPON AEROSIL CO., LTD., T805) are mixed with a sample mill at 10,000 rpm (revolutions per minute) for 30 seconds. Subsequently, the mixture is sifted with a vibratory sieve having a sieve opening of 45 μm to prepare a toner (1). The obtained toner (1) is found to have a volume-average particle size of 6.1

Preparation of Electrostatic Image Developer

The obtained electrostatic image developing toner (1) (8 parts by mass) and 100 parts by mass of a resin-covered ferrite carrier (average particle size: 35 μm) are mixed to prepare a two-component developer. Thus, a developer (electrostatic image developer) is obtained. The obtained developer is charged into the development unit of a DocuPrint C2220 (manufactured by Fuji Xerox Co., Ltd.), and subjected to seasoning in a low-temperature low-humidity environment (10° C./15% RH) for 24 hours.

Examples 2 to 23 and Comparative Examples 1 and 2

In Examples 2 to 23, Comparative Example 1, and Comparative Example 2, toners 2 to 23 and toners of Comparative Examples 1 and 2 are prepared as in Example 1, from resin-particle dispersion liquids, pigment-particle dispersion liquids, and release-agent-particle dispersion liquids in Tables 2-1 and 2-2. The toners are processed as in Example 1 to obtain electrostatic image developers.

Example 24

A toner is prepared as in Example 1 except that 20 parts of the coloring-agent-particle dispersion liquid (1) in Example 1 is added together with 0.01 parts of o-anisidine (1-amino-2-methoxybenzene, manufactured by FUJIFILM Wako Pure Chemical Corporation). Thus, a toner (24) and an electrostatic image developing toner are obtained.

Example 25

A toner is prepared as in Example 1 except that 20 parts of the coloring-agent-particle dispersion liquid (1) in Example 1 is added together with 0.02 parts of o-anisidine (manufactured by FUJIFILM Wako Pure Chemical Corporation). Thus, a toner (25) and an electrostatic image developing toner are obtained.

Example 26

A toner is prepared as in Example 1 except that 20 parts of the coloring-agent-particle dispersion liquid (1) in Example 1 is added together with 0.03 parts of o-anisidine (manufactured by FUJIFILM Wako Pure Chemical Corporation). Thus, a toner (26) and an electrostatic image developing toner are obtained.

Example 27

A toner is prepared as in Example 1 except that, in the process of heating to 87° C., holding for 30 minutes, and cooling at 1° C./min to 30° C. in Example 1, the cooling rate is changed to 3° C./min. Thus, a toner (27) and an electrostatic image developing toner are obtained.

Example 28

A toner is prepared as in Example 1 except that, in the process of heating to 87° C., holding for 30 minutes, and cooling at 1° C./min to 30° C. in Example 1, the cooling rate is changed to 2° C./min. Thus, a toner (28) and an electrostatic image developing toner are obtained.

Example 29

A toner is prepared as in Example 1 except that, in the process of heating to 87° C., holding for 30 minutes, and cooling at 1° C./min to 30° C. in Example 1, the cooling rate is changed to 0.7° C./min. Thus, a toner (29) and an electrostatic image developing toner are obtained.

Example 30

A toner is prepared as in Example 1 except that, in the process of heating to 87° C., holding for 30 minutes, and cooling at 1° C./min to 30° C. in Example 1, the cooling rate is changed to 0.5° C./min. Thus, a toner (30) and an electrostatic image developing toner are obtained.

Example 31

The styrene-acrylic-modified polyester resin (SPE 21) (92.1 parts), 4 parts of C.I. Pigment Yellow 74 (commercially available product), and 3.9 parts of paraffin wax (HNP-9, manufactured by NIPPON SEIRO CO., LTD.) are sufficiently pre-mixed with a Henschel mixer, melt-kneaded with a double roll mill, cooled, subsequently pulverized with a jet mill, and classified twice with an air classifier, to obtain toner particles (31).

Relative to 100 parts of the obtained toner particles (31), 1.5 parts of hydrophobic silica (manufactured by NIPPON AEROSIL CO., LTD., RY50) and 1.0 part of hydrophobic titanium oxide (manufactured by NIPPON AEROSIL CO., LTD., T805) are mixed with a sample mill at 10,000 rpm (revolutions per minute) for 30 seconds. Subsequently, the mixture is sifted with a vibratory sieve having a sieve opening of 45 µm to prepare a toner (31). The obtained toner (31) is found to have a volume-average particle size of 7.0 µm.

Comparative Example 3

A toner and an electrostatic image developing toner are obtained as in Example 1 except that the styrene-acrylic-modified polyester resin particle dispersion liquid in Example 1 is replaced by a dispersion liquid mixture in which the comparative resin-particle dispersion liquid (P1) and the comparative styrene-acrylic resin particle dispersion liquid (S1) are mixed in 4:1.

Comparative Example 4

A toner and an electrostatic image developing toner are obtained as in Example 1 except that the styrene-acrylic-modified polyester resin particle dispersion liquid in Example 1 is replaced by the comparative styrene-acrylic resin particle dispersion liquid (S1).

Reducibility of Gloss Non-Uniformity

Each of the developers obtained in Examples and Comparative Examples is charged into the development unit of an image forming apparatus "DocuCentre Color 400, manufactured by Fuji Xerox Co., Ltd.". This image forming apparatus is used in an environment at a temperature of 35° C. and at a humidity of 85% RH, to print Test Chart No. 5-1 of the Society of Electrophotography of Japan at a process speed of 228 mm/s, as 100% area coverage solid images (images having a toner mass per unit area (TMA) of 3.8 g/m$^2$) on 1,000 sheets of OS coat paper (trade name, manufactured by Oji Paper Co., Ltd.). Subsequently, 100% area coverage solid images (images having a toner mass per unit area (TMA) of 14.4 g/m$^2$) are printed at a fixing temperature of 190° C., at a process speed of 60 m/s, and on 1,000 sheets of OS coat paper.

In Test Chart No. 5-1 of the Society of Electrophotography of Japan printed on the ist OS coat paper sheet and Test Chart No. 5-1 of the Society of Electrophotography of Japan printed after the 1,000th sheet, gloss of green regions is measured in the following manner.

The gloss is measured with a mobile glossmeter (BYK Gardner micro-TRI-gloss, manufactured by Toyo Seiki Seisaku-sho, Ltd.): 60° gloss is measured at 5 points.

The difference between measured gloss values is determined and evaluated in accordance with the following evaluation grades.

A: gloss difference between maximum value and minimum value in 1,001 output images is less than 5°

B: gloss difference between maximum value and minimum value in 1,001 output images is 5° or more and less than 7°

C: gloss difference between maximum value and minimum value in 1,001 output images is 7° or more and less than 10°

D: gloss difference between maximum value and minimum value in 1,001 output images is 10° or more The evaluation results are summarized in Table 2-2.

TABLE 1

| | SPE 1 | SPE 2 | SPE 3 | SPE 4 | SPE 5 | SPE 6 | SPE 7 | SPE 8 | SPE 9 | SPE 10 | SPE 11 | SPE 12 | SPE 13 | SPE 14 | SPE 15 | SPE 16 | SPE 17 |
|---|---|---|---|---|---|---|---|---|---|---|---|---|---|---|---|---|---|
| Amorphous polyester resin A | 800 | 800 | 800 | 600 | 600 | 550 | — | — | — | — | — | — | 600 | 600 | 600 | 800 | 800 |
| Amorphous polyester resin B | — | — | — | — | — | — | 800 | — | — | — | — | — | — | — | — | — | — |
| Amorphous polyester resin C | — | — | — | — | — | — | — | 800 | — | — | — | — | — | — | — | — | — |
| Amorphous polyester resin D | — | — | — | — | — | — | — | — | 800 | — | — | — | — | — | — | — | — |
| Amorphous polyester resin E | — | — | — | — | — | — | — | — | — | 800 | — | — | — | — | — | — | — |

TABLE 1-continued

| | SPE 1 | SPE 2 | SPE 3 | SPE 4 | SPE 5 | SPE 6 | SPE 7 | SPE 8 | SPE 9 | SPE 10 | SPE 11 | SPE 12 | SPE 13 | SPE 14 | SPE 15 | SPE 16 | SPE 17 |
|---|---|---|---|---|---|---|---|---|---|---|---|---|---|---|---|---|---|
| Amorphous polyester resin F | — | — | — | — | — | — | — | — | — | — | 800 | — | — | — | — | — | — |
| Amorphous polyester resin G | — | — | — | — | — | — | — | — | — | — | — | 800 | — | — | — | — | — |
| Styrene | 100 | 100 | 100 | 200 | 200 | 200 | 100 | 100 | 100 | 100 | 100 | 100 | 40 | 60 | 225 | 100 | 100 |
| Butyl acrylate | 82 | 79 | 74 | 188 | 182 | 230 | 82 | 82 | 82 | 82 | 83 | 74 | 342 | 322 | 157 | 83.5 | 69 |
| Acrylic acid | 16 | 16 | 16 | 8 | 8 | 8 | 16 | 16 | 16 | 16 | 16 | 16 | 8 | 8 | 8 | 16 | 16 |
| 1,10-Decanediol diacrylate | 2 | 5 | 10 | 4 | 10 | 12 | 2 | 2 | 2 | 2 | 1 | 10 | 10 | 10 | 10 | 0.5 | 15 |

TABLE 2-1

| | Resin-particle dispersion liquid | Pigment | Release agent | Formula (1) b/a | Formula (2) b/c | Formula (3) d/e | Mz (×10$^5$) | Mw (×10$^5$) | Gel fraction (%) |
|---|---|---|---|---|---|---|---|---|---|
| Example 1 | SPE1 | 1 | 1 | 1.5 | 2.8 | 2.3 | 78 | 6.7 | 3.4 |
| Example 2 | SPE2 | 1 | 1 | 1.9 | 2.7 | 2.2 | 84 | 7.0 | 6.3 |
| Example 3 | SPE3 | 1 | 1 | 2.4 | 2.8 | 2.3 | 91 | 8.2 | 10.3 |
| Example 4 | SPE4 | 1 | 1 | 1.5 | 2.8 | 2.1 | 98 | 9.2 | 3.5 |
| Example 5 | SPE5 | 1 | 1 | 2.0 | 2.7 | 2.1 | 98 | 9.1 | 11.3 |
| Example 6 | SPE6 | 1 | 1 | 1.9 | 2.2 | 1.9 | 72 | 6.7 | 14.3 |
| Example 7 | SPE7 | 1 | 1 | 1.7 | 2.7 | 2.2 | 28 | 4.2 | 4.1 |
| Example 8 | SPE8 | 1 | 1 | 1.8 | 2.8 | 2.3 | 57 | 5.2 | 4.8 |
| Example 9 | SPE9 | 1 | 1 | 2.0 | 2.8 | 2.3 | 121 | 11.0 | 8.3 |
| Example 10 | SPE10 | 1 | 1 | 2.2 | 2.9 | 2.3 | 143 | 14.0 | 11.7 |
| Example 11 | SPE11 | 1 | 1 | 1.5 | 2.8 | 2.2 | 79 | 7.5 | 2.8 |
| Example 12 | SPE12 | 1 | 1 | 2.5 | 2.8 | 2.3 | 88 | 7.4 | 15.4 |
| Example 13 | SPE13 | 1 | 1 | 1.7 | 2.7 | 2.2 | 85 | 7.3 | 6.2 |
| Example 14 | SPE14 | 1 | 1 | 1.8 | 2.7 | 2.2 | 89 | 7.5 | 6.5 |
| Example 15 | SPE15 | 1 | 1 | 1.9 | 2.8 | 2.3 | 82 | 7.0 | 6.3 |
| Example 16 | SPE18 | 1 | 1 | 1.5 | 2.8 | 2.2 | 83 | 7.2 | 6.4 |
| Example 17 | SPE19 | 1 | 1 | 1.9 | 2.9 | 2.3 | 91 | 7.8 | 6.3 |
| Example 18 | SPE20 | 1 | 1 | 2.3 | 2.8 | 2.3 | 102 | 9.5 | 8.6 |
| Example 19 | SPE2 | 2 | 1 | 1.9 | 2.7 | 2.2 | 84 | 7.2 | 6.1 |
| Example 20 | SPE2 | 2 | 1 | 1.9 | 2.9 | 2.3 | 83 | 7.1 | 6.3 |
| Example 21 | SPE2 | 3 | 1 | 1.9 | 2.8 | 2.3 | 79 | 6.9 | 6.2 |
| Example 22 | SPE2 | 1 | 2 | 1.8 | 2.7 | 2.2 | 78 | 7.0 | 6.2 |
| Example 23 | SPE2 | 1 | 3 | 1.9 | 2.8 | 2.3 | 85 | 7.2 | 6.1 |
| Example 24 | SPE2 | 1 | 1 | 1.8 | 2.8 | 2.2 | 89 | 7.5 | 6.2 |
| Example 25 | SPE2 | 1 | 1 | 1.8 | 2.7 | 2.2 | 85 | 7.1 | 6.1 |
| Example 26 | SPE2 | 1 | 1 | 1.9 | 2.9 | 2.3 | 80 | 6.9 | 6.5 |
| Example 27 | SPE2 | 1 | 1 | 1.9 | 2.8 | 2.3 | 81 | 7.0 | 6.3 |
| Example 28 | SPE2 | 1 | 1 | 1.9 | 2.8 | 2.3 | 86 | 7.5 | 6.5 |
| Example 29 | SPE2 | 1 | 1 | 1.8 | 2.7 | 2.2 | 86 | 7.2 | 6.4 |
| Example 30 | SPE2 | 1 | 1 | 2.0 | 2.8 | 2.2 | 85 | 7.3 | 6.2 |
| Example 31 | SPE21 | PY74 | HNP-9 | 2.0 | 2.8 | 2.3 | 76 | 6.5 | 6.3 |
| Comparative Example 1 | SPE16 | 1 | 1 | 1.1 | 2.1 | 1.9 | 75 | 6.4 | 1.3 |
| Comparative Example 2 | SPE17 | 1 | 1 | 2.6 | 3.0 | 2.8 | 105 | 9.8 | 15.3 |
| Comparative Example 3 | P1-S1 (4:1) dispersion liquid mixture | 1 | 1 | 1.8 | 2.7 | 2.1 | 73 | 7.0 | 4.5 |
| Comparative Example 4 | S1 | 1 | 1 | 1.6 | 2.6 | 2.1 | 62 | 6.3 | 3.7 |

TABLE 2-2

| | Percentage of St amount in binder resin (%) | Amount of 1-amino-2-methoxy-benzene (ppm) | Release agent domain size (nm) | Reducibility of gloss non-uniformity |
|---|---|---|---|---|
| Example 1 | 10 | 15 | 800 | B |
| Example 2 | 10 | 8 | 780 | A |
| Example 3 | 10 | 5 | 740 | A |
| Example 4 | 20 | 12 | 760 | A |
| Example 5 | 20 | 8 | 700 | A |
| Example 6 | 20 | 16 | 720 | C |
| Example 7 | 10 | 11 | 760 | C |
| Example 8 | 10 | 6 | 700 | B |
| Example 9 | 10 | 8 | 760 | A |
| Example 10 | 10 | 13 | 780 | C |
| Example 11 | 10 | 17 | 780 | B |
| Example 12 | 10 | 4 | 760 | B |

TABLE 2-2-continued

|  | Percentage of St amount in binder resin (%) | Amount of 1-amino-2-methoxy-benzene (ppm) | Release agent domain size (nm) | Reducibility of gloss non-uniformity |
|---|---|---|---|---|
| Example 13 | 4 | 14 | 720 | A |
| Example 14 | 6 | 12 | 700 | A |
| Example 15 | 22.5 | 8 | 800 | B |
| Example 16 | 16 | 11 | 820 | A |
| Example 17 | 16 | 9 | 720 | A |
| Example 18 | 16 | 8 | 780 | A |
| Example 19 | 10 | 0 | 760 | C |
| Example 20 | 10 | 0 | 780 | B |
| Example 21 | 10 | 0 | 720 | C |
| Example 22 | 10 | 11 | 780 | A |
| Example 23 | 10 | 12 | 760 | A |
| Example 24 | 10 | 91 | 800 | A |
| Example 25 | 10 | 182 | 780 | B |
| Example 26 | 10 | 305 | 780 | B |
| Example 27 | 10 | 16 | 280 | C |
| Example 28 | 10 | 15 | 520 | A |
| Example 29 | 10 | 7 | 1280 | A |
| Example 30 | 10 | 18 | 1540 | C |
| Example 31 | 10 | 4 | 1040 | B |
| Comparative Example 1 | 10 | 13 | 780 | D |
| Comparative Example 2 | 10 | 16 | 760 | D |
| Comparative Example 3 | 15 | 12 | 760 | D |
| Comparative Example 4 | 75 | 15 | 800 | D |

In Table 2-1, Mz and Mw are Mz and Mw of the binder resin of a toner. In Table 2-1, the gel fraction is the gel fraction of a hybrid resin. In Table 2-2, the amount of 1-amino-2-methoxybenzene is the amount of 1-amino-2-methoxybenzene in a toner.

The results in Table 2-2 have demonstrated that, compared with the electrostatic image developing toners of Comparative Examples, the electrostatic image developing toners of Examples have high reducibility of gloss non-uniformity even in the case of forming images having high toner mass per unit area.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An electrostatic image developing toner comprising: toner base particles including at least a binder resin and a release agent,
wherein the binder resin includes a hybrid resin having a polyester resin segment and a styrene-acrylic copolymer segment, and
a molecular weight distribution curve of the toner satisfies Formula (1):

$$1.3 \leq b/a \leq 2.5 \qquad (1)$$

where, in the molecular weight distribution curve in which a perpendicular line is drawn from a baseline to a peak top having a peak top height to divide the molecular weight distribution curve into a lower-molecular-weight region and a higher-molecular-weight region, a represents a width of the lower-molecular-weight region at a height of 15% of the peak top height, and b represents a width of the higher-molecular-weight region at a height of 15% of the peak top height.

2. The electrostatic image developing toner according to claim 1, wherein the molecular weight distribution curve of the toner satisfies Formula (2):

$$2.5 \leq b/c \qquad (2)$$

where c represents a width of the higher-molecular-weight region at a height of 40% of the peak top height.

3. The electrostatic image developing toner according to claim 1, wherein the molecular weight distribution curve of the toner has a width d at a height of 15% of the peak top height and a width e at a height of 40% of the peak top height, and the width d and the width e satisfy $d/e \geq 2.0$.

4. The electrostatic image developing toner according to claim 1, wherein the binder resin has a weight-average molecular weight Mw of 50,000 or more and 120,000 or less.

5. The electrostatic image developing toner according to claim 1, wherein the binder resin has a Z-average molecular weight Mz of 200,000 or more and 1,300,000 or less.

6. The electrostatic image developing toner according to claim 1, wherein the hybrid resin has a gel fraction of 3 mass % or more and 15 mass % or less.

7. The electrostatic image developing toner according to claim 1, wherein a monomer component constituting the styrene-acrylic copolymer segment is a linear aliphatic diol di(meth)acrylate compound.

8. The electrostatic image developing toner according to claim 7, wherein the linear aliphatic diol di(meth)acrylate compound is 1,10-decanediol diacrylate.

9. The electrostatic image developing toner according to claim 1, wherein the toner base particles further include a coloring agent.

10. The electrostatic image developing toner according to claim 9, wherein the coloring agent includes C.I. Pigment Yellow 74.

11. The electrostatic image developing toner according to claim 1, wherein, in the hybrid resin, a content of a styrene-derived constitutional unit relative to a total mass of the hybrid resin is 5 mass % or more and 20 mass % or less.

12. The electrostatic image developing toner according to claim 1, wherein, in the hybrid resin, an amount of the polyester resin segment relative to a total mass of the hybrid resin is 40 mass % or more and 95 mass % or less.

13. The electrostatic image developing toner according to claim 1, wherein, in the toner base particles, the release agent has a domain size of 400 nm or more and 1,500 nm or less.

14. The electrostatic image developing toner according to claim 1, wherein the toner base particles further include 1-amino-2-methoxybenzene.

15. The electrostatic image developing toner according to claim 14, wherein a content of the 1-amino-2-methoxybenzene relative to a total mass of the toner is 1 ppm or more and 100 ppm or less.

16. An electrostatic image developer comprising the electrostatic image developing toner according to claim 1.

17. A toner cartridge comprising the electrostatic image developing toner according to claim 1, wherein the toner cartridge is attachable to and detachable from an image forming apparatus.

* * * * *